US007478023B2

(12) United States Patent
Yu

(10) Patent No.: US 7,478,023 B2
(45) Date of Patent: Jan. 13, 2009

(54) COUPLED ALGORITHMS FOR VISCOELASTIC INK-JET SIMULATIONS

(75) Inventor: Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 461 days.

(21) Appl. No.: 11/205,441

(22) Filed: Aug. 17, 2005

(65) Prior Publication Data

US 2006/0259288 A1    Nov. 16, 2006

Related U.S. Application Data

(60) Provisional application No. 60/680,747, filed on May 13, 2005, provisional application No. 60/684,763, filed on May 25, 2005.

(51) Int. Cl.
*G06F 7/48* (2006.01)
(52) U.S. Cl. .................. 703/9; 347/6; 347/17; 427/64; 427/258; 422/99; 422/139
(58) Field of Classification Search ...................... 703/9; 347/6, 17; 702/50; 427/258, 64; 141/5; 239/418; 166/249; 422/99, 130; 73/54.01; 264/40.1

See application file for complete search history.

(56) References Cited

U.S. PATENT DOCUMENTS

| 2001/0028122 | A1* | 10/2001 | Narushima et al. .......... 264/40.1 |
|---|---|---|---|
| 2002/0116987 | A1* | 8/2002 | Braithwaite et al. ......... 73/54.01 |
| 2003/0060988 | A1* | 3/2003 | Ginzburg ..................... 702/50 |
| 2004/0131778 | A1* | 7/2004 | Verhoest et al. ............. 427/258 |
| 2004/0166025 | A1* | 8/2004 | Chan et al. ..................... 422/99 |
| 2004/0179980 | A1* | 9/2004 | Pattekar et al. .............. 422/130 |
| 2004/0181383 | A1* | 9/2004 | Yu et al. ........................ 703/9 |
| 2005/0022895 | A1* | 2/2005 | Barth et al. ..................... 141/5 |
| 2005/0028971 | A1* | 2/2005 | Corvera-Poire et al. ..... 166/249 |
| 2005/0046649 | A1* | 3/2005 | Yu et al. ......................... 347/6 |
| 2005/0084605 | A1* | 4/2005 | Kathirgamanathan ........ 427/64 |
| 2005/0179715 | A1* | 8/2005 | Merz et al. .................... 347/17 |
| 2006/0169800 | A1* | 8/2006 | Rosell et al. ................. 239/418 |

OTHER PUBLICATIONS

"Fronts Propagating with Curvature-Dependent Speed: Algorithms Based on Hamilton-Jacobi Formulations", S. Osher, et al., Journal of Computational Physics 79, pp. 12-49, 1988.

(Continued)

*Primary Examiner*—Kandasamy Thangavel

(57) ABSTRACT

Two finite difference algorithms on rectangular grids are provided for viscoelastic ink ejection simulations. The first algorithm is first-order accurate in time, while the second algorithm is second-order accurate in time. Each of these two algorithms seamlessly couples or incorporates several features: (1) a coupled level set-projection method for incompressible immiscible two-phase fluid flows; (2) a higher-order Godunov type algorithm for the convection terms in the momentum equations and level set convection equation; (3) the central difference for viscosity, surface tension, and upper-convected derivative terms; (4) an equivalent circuit for inflow pressure (or inflow rate). In the first algorithm, a simple first-order upwind algorithm is designed for the convection term in the viscoelastic stress equations. But in the second algorithm, a second-order Godunov type upwind scheme is employed for the convection term in the viscoelastic stress equations.

10 Claims, 14 Drawing Sheets

OTHER PUBLICATIONS

"A coupled quadrilateral grid level set projection method applied to ink jet simulation", Jiun-Der Yu, et al., Journal of Computational Physics, 206(1), pp. 227-251, 2005.

"Dynamics of Piezoelectric Inkjet Printing Systems", S. Sakai, Proc. *IS&Ts NIP 16* International Conference on Digital Printing Technologies, pp. 15-20, 2000.

\* cited by examiner

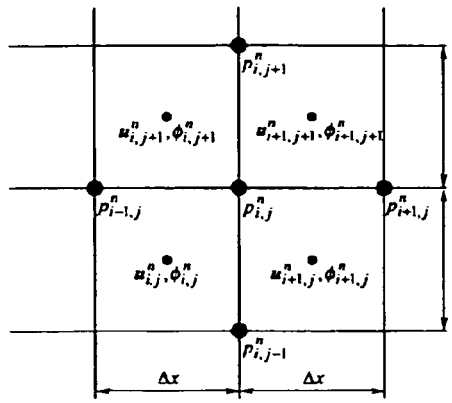
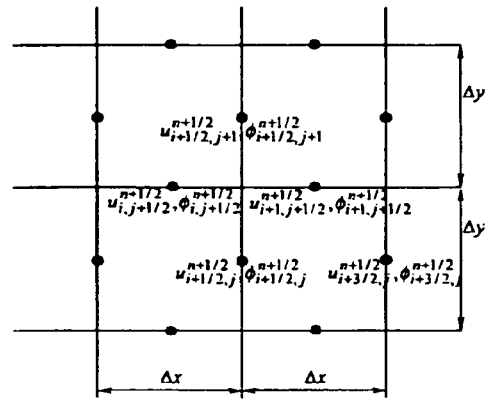
Discrete velocity field, pressure and level set
Figure 4a
Intermediate velocity field and level set
Figure 4b
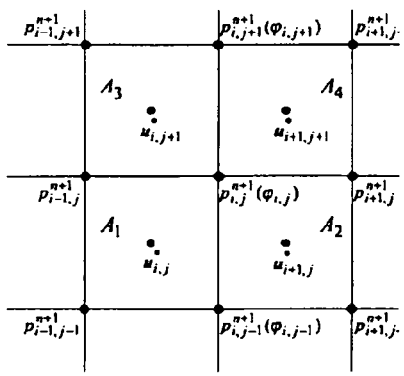
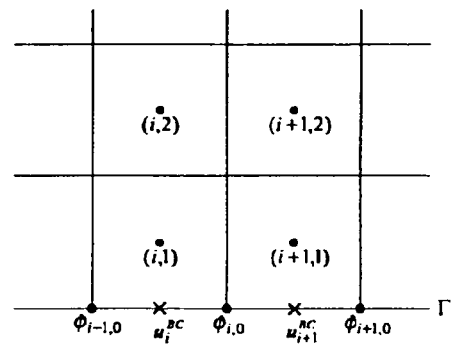
Velocity $u^*$, pressure $p_{i,j}^{n+1}$, and shape fcn. $\psi_{i,j}$
Figure 5a
Velocity $u^*$, pressure, and shape fcn.
Figure 5b

COUPLED ALGORITHMS FOR VISCOELASTIC INK-JET SIMULATIONS

RELATED APPLICATIONS

This application claims priority under 35 U.S.C. § 199(e) on (1) provisional application Ser. No. 60/680,747, filed May 13, 2005, and entitled "A Coupled Algorithm for Viscoelastic Ink Jet Simulations"; and (2) provisional application Ser. No. 60/684,763, filed on May 25, 2005, and entitled "A Second-Order Improvement to the Coupled Algorithm for Viscoelastic Ink Jet Simulations." The contents of each of these provisional applications is incorporated by reference herein in its entirety.

BACKGROUND OF THE INVENTION

1. Field of the Invention

The present invention relates to two finite difference algorithms and associated models for viscoelastic ink ejection simulation. One algorithm is first-order accurate in time, while the other is second-order accurate in time. The algorithms may be embodied in software, hardware or combination thereof and may be implemented on a computer or other processor-controlled device.

2. Description of the Related Art

Results of ink-jet simulation have been very useful in the design of piezoelectric ink-jet print heads. A practical ink-jet simulation may be carried out using an analytical tool such as an equivalent circuit that receives as an input the dynamic voltage to be applied to a piezoelectric actuator and simulates the ink behavior under the influence of the ink cartridge, supply channel, vibration plate, and actuator. That is, from the input voltage and an ink flow rate, the equivalent circuit calculates an inflow pressure that drives computational fluid dynamics (CFD) code. The CFD code then solves the governing partial differential equations, i.e., the incompressible Navier-Stokes equations for two-phase flows, for fluid velocity, pressure and interface position, and feeds back the ink flow rate to the equivalent circuit. The sequence is repeated as long as needed.

The dynamics of fluid flow through the ink nozzle, coupled to surface tension effects along the ink-air interface and boundary conditions along the wall, act to determine the shape of the interface as it moves. Designing the CFD code largely involves taking into account the dynamically changing ink-air interface, which is quite challenging.

One method that has been used to model the ink-air interface is the volume of fluid method (VOF). VOF performs fairly well with regard to mass conversation but is not so accurate on surface tension aspects of fluid flow, especially when the ink droplet is smaller than 5 pico liters. Considering that the capability of ejecting ultra small ink droplets is essential for any photo quality ink-jet printer today, VOF gave way to an improved modeling method which included the level set method to more accurately capture the ink-air interface in CFD simulations. Since there is a mathematical relation between the level set and the interface curvature, and hence the surface tension, the level set method excels whenever surface tension is important.

One way to solve the level set equations is by finite element analysis. However, because this solving method usually results in a serious mass conservation problem, finite difference analysis is usually the best choice among numerical schemes to be used with the level set method.

The present invention continues along this technological path of using finite difference analysis in ink ejection simulation. In so doing, the present invention provides substantial improvements in finite difference algorithms performed on rectangular grids for viscoelastic ink ejection simulations.

SUMMARY OF THE INVENTION

Two finite difference algorithms on rectangular grids are provided for viscoelastic ink ejection simulations. The first algorithm is first-order accurate in time, while the second algorithm is second-order accurate in time. Each of these two algorithms seamlessly couples or incorporates several features: (1) a coupled level set-projection method for incompressible immiscible two-phase fluid flows; (2) a higher-order Godunov type algorithm for the convection terms in the momentum equations and level set convection equation; (3) the central difference for viscosity, surface tension, and upper-convected derivative terms; (4) an equivalent circuit for inflow pressure (or inflow rate). In the first algorithm, a simple first-order upwind algorithm is designed for the convection term in the viscoelastic stress equations. But in the second algorithm, a second-order Godunov type upwind scheme is employed for the convection term in the viscoelastic stress equations. Both algorithms can be implemented in software using, for example, Fortran or C language. To simplify the presentation, the linear Oldroyd-b viscoelastic fluid model is used herein, and only the axi-symmetric coordinate system is considered. However, the algorithms can be applied equally well to most of the existing linear or nonlinear viscoelastic fluid models, as well in 2D and 3D Cartesian coordinate systems.

In one aspect, the invention involves a method for simulating and analyzing viscoelastic fluid flow through, and ejection from, a channel having a boundary between a first fluid (e.g., viscoelastic ink) that flows through the channel (e.g., an ink-jet nozzle) and a second fluid (e.g., air). The method generally comprises: performing finite difference analysis and a level set projection method to solve, with reference to a rectangular grid, equations governing the viscoelastic flow of the first fluid through the channel, including viscoelastic stress equations, the finite difference analysis being performed by one of a first algorithm that incorporates a first-order upwind scheme for a convection term in the viscoelastic stress equations or a second algorithm that incorporates a second-order Godunov type upwind scheme, the finite difference analysis and level set projection method being performed to simulate the flow of the first fluid through, and ejection from, the channel; and updating, periodically during the simulation, the level set for the first and second fluids.

In another aspect, the invention involves an apparatus configured to carry out the processing described above. The apparatus comprises one or more components or modules for carrying out the processing or aspects thereof. Each component or module may be implemented in software or hardware. In the latter case, any such component/module may include one or more of the following: an instruction-based processor (e.g., a central processing unit (CPU)), an Application Specific Integrated Circuit (ASIC), digital signal processing circuitry, or combination thereof. Multiple components/modules may be combined, as appropriate, in any implementation.

In accordance with further aspects of the invention, the method described above or steps thereof may be embodied in a set of instructions (e.g., software), which is carried on a medium or waveform and conveyed to a computer or other processor-controlled device for execution. The set of instructions may be conveniently implemented in software as indicated above. Alternatively, any or all of the instructions may be implemented using functionally equivalent hardware (e.g., application specific integrated circuit (ASIC), digital signal processing circuitry, etc.) or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIGS. 4a and 4b are schematic illustrations showing the locations of variables on uniform rectangular grids;

FIGS. 5a and 5b are schematic illustrations showing the locations of variables for the projection step;

DESCRIPTION OF THE PREFERRED EMBODIMENTS

I. Introduction

Figure 1:
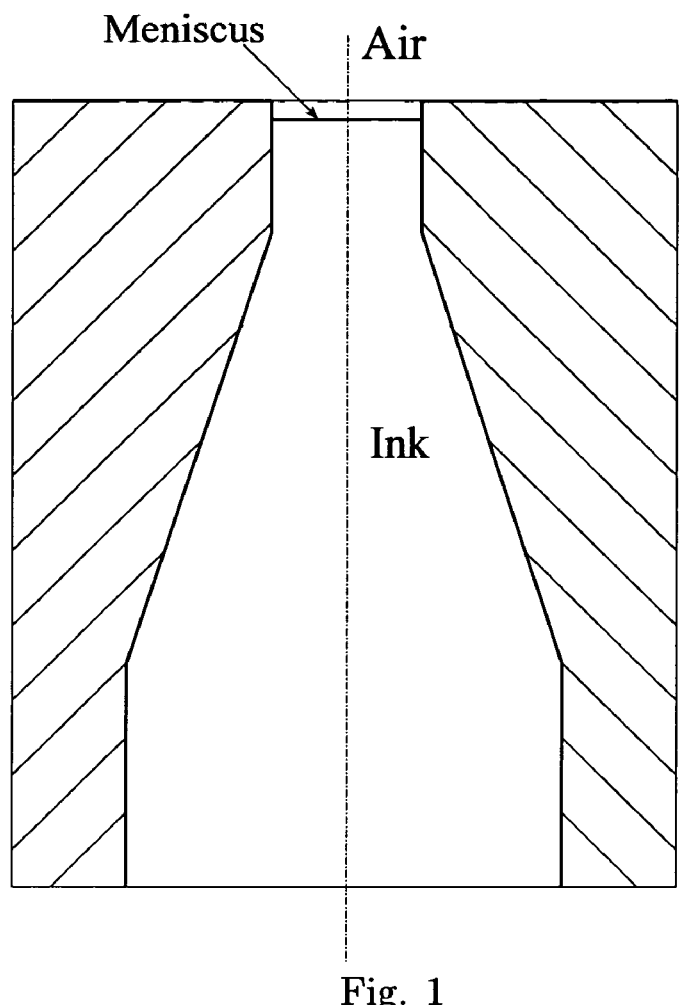
FIG. 1 is a cross sectional view of a typical ink-jet nozzle.

The present invention involves the development and realization of a numerical simulation tool for viscoelastic fluid flow phenomena associated with ink-jet devices. The typical structure of an ink-jet nozzle is shown in FIG. 1. The actual geometry is axisymmetric, and the drawing is not drawn to scale. Ink is stored in a cartridge, and driven through the nozzle in response to a dynamic pressure applied at the lower boundary, i.e., the nozzle inlet. The dynamics of incompressible viscoelastic fluid flow, coupled to surface tension effects along the ink-air interface and boundary conditions along the wall, act to determine the shape of the interface as it moves through the nozzle. A negative pressure at the lower boundary induces a backflow, which causes a bubble to pinch off and move through the domain.

The flow of regular dye-based inks used in desktop printers is Newtonian, which means that the relation between the stress tensor and the rate of deformation tensor at any instant is linear and not related to any other instant. In a related application filed on Mar. 14, 2003 and identified by Ser. No. 10/390,239 a coupled quadrilateral grid level set projection scheme for the simulation of ink droplet ejection and other newtonian fluid phenomena is disclosed. The contents of this related application are incorporated by reference herein.

Pigment-based inks improve the color durability of a printout but do not behave the same way as regular dye-based inks. Pigment-based inks, as well as inks used in industrial printing applications, are usually viscoelastic, i.e., the relation between the stress tensor and the rate of deformation tensor at an instant depends on the deformation history. Viscoelastic inks and Newtonian inks having the same dynamic viscosity may behave very differently in terms of jettability and other ink-jet performance characteristics.

Figure 2:
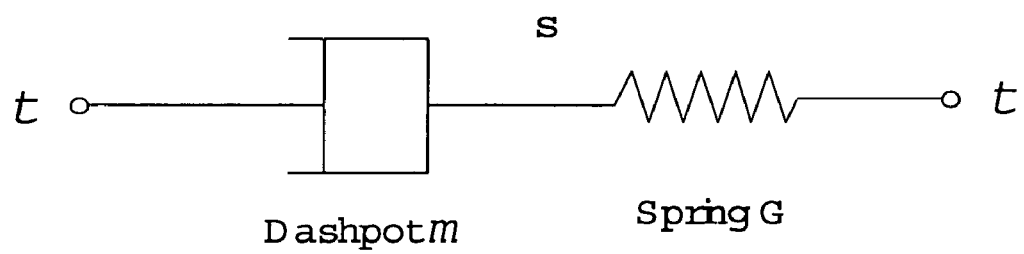
FIG. 2 is a simple Maxwell model for viscoelastic fluid.

A simple Maxwell's viscoelastic model is shown in FIG. 2, where $\tau$ represents the stress, s the rate of deformation, $\mu$ the dynamic viscosity, and G the elastic constant. Assuming both the spring and dashpot in the model are linear, the governing equation is that which is set forth in (1) in the Appendix (along with other number-identified equations referenced in the following discussion). The equation indicates that the stress at a given instant depends on both the rate of deformation and the stress right before the instant. The term $G/\mu$ has the dimension of time, and hence is referred to as the relaxation time. If a viscoelastic fluid has a long relaxation time, the fluid behaves very different from a Newtonian fluid. For a Newtonian fluid, the material model does not have the spring. Hence, the constitutive relation is simply as set forth in equation (2) in the Appendix.

The fluid model considered in this work is based on the Maxwell type viscoelastic model. For simplicity of presentation, consider the linear Maxwell model, i.e., both the dynamic viscosity and relaxation time are constant. At the level of continuum mechanics, the model is usually referred to as the Oldroyd-b model. The purpose here is to simulate two-phase immiscible incompressible flows in the presence of surface tension and density jump across the interface separating ink (viscoelastic) and air (Newtonian), incorporated with a macroscopic slipping contact line model, which describes the air-ink-wall dynamics. The fluid interface between the air and the ink is treated as an infinitely thin immiscible boundary, separating regions of differing but constant densities and viscosities. The flow is axisymmetric, and for boundary conditions on solid walls it is assumed that both the normal and tangential component of the fluid velocity vanish, although this assumption is modified by the contact model at places where the interface meets the nozzle wall.

In this invention, two finite difference algorithms on rectangular grids are developed for viscoelastic ink ejection simulations. The first algorithm is first-order accurate in time, while the second algorithm is second-order accurate in time. These two algorithms seamlessly incorporate several features: (1) a coupled level set-projection method for incompressible immiscible two-phase fluid flows; (2) a higher-order Godunov type algorithm for the convection terms in the momentum equations and level set convection equation; (3) the central difference for viscosity, surface tension, and upper-convected derivative terms; (4) equivalent circuit for inflow pressure (or inflow rate). In the first algorithm, a simple first-order upwind algorithm is designed for the convection term in the viscoelastic stress equations. But in the second algorithm, a second-order Godunov type upwind scheme is employed for the convection term in the viscoelastic stress equations. They are both easy to implement using Fortran or C language. To simplify the presentation, the linear Oldroyd-b viscoelastic fluid model is used herein, and only the axi-symmetric coordinate system is considered. However, the algorithms can be applied equally well to most of the existing linear or nonlinear viscoelastic fluid models as well in 2D and 3D Cartesian coordinate systems.

II. Level Set Formulation

II.1 Governing Equations

Fluid #1 is a viscoelastic fluid, and in the illustrated embodiments is ink. The Oldroyd-b viscoelastic fluid model is used to present the algorithms. Hence, fluid #1 is governed by equations (3). Fluid #2 (e.g., air) is governed by the incompressible Navier-Stokes equations (4). In these equations, the rate of deformation tensor and the fluid velocity are defined in (5). $Du_i/Dt=[\partial/\partial t+(u_i\cdot\nabla)]u_i$ is the Lagrangian time derivative, $p_i$ the pressure, $\tau_1$ the viscoelastic stress tensor of fluid #1, $\rho_i$ the density, $\mu_i$ the dynamic viscosity, $\lambda_1$ the viscoelastic relaxation time of fluid #1, $\mu_{p1}$ the solute dynamic viscosity of fluid #1. The subscript i=1,2 is used to denote the variable or constant in fluid #1 (ink) or fluid #2 (air).

It should be noted that since fluid #2 is assumed to be the air, which is Newtonian in its flow characteristics, the viscoelastic stress tensor $\tau_2$ vanishes in fluid #2. The dynamic viscosity $\mu_1$ is actually the dynamic viscosity of the ink solvent, which is usually the water. In addition, the first three terms together in the second equation in (3): $D\tau_1/Dt-\tau_1\cdot(\nabla u_1)-(\nabla u_1)^T\cdot\tau_1$ are collective as the upper-convected time derivative of the viscoelastic stress tensor. It is used in the Oldroyd-b model to guarantee the material frame indifference. If one replaces the upper-convected time derivative with the material time derivative, the second equation of (3) will look similar to (1) in format. Also, because the size of typical ink-jet print heads is small, the gravity term is not important and is therefore omitted. The inclusion of a gravity term does not change any part of the numerical schemes described in the next sections. Finally, the numerical schemes described herein work equally well for cases in which both fluids are viscoelastic.

The boundary conditions at the interface of the two phases are the continuity of the velocity and the jump condition set forth in (6), where n is the unit normal to the interface drawn from fluid #2 to fluid #1, κ is the curvature of the interface, and σ is the surface tension coefficient.

The level set method is used to trace the interface as is known from the literature. The interface is the zero level of the level set function φ as defined in (7). Here, the level set function φ is initialized as the signed distance to the interface. The unit normal on the interface and the interface curvature can be expressed in terms of φ as in (8).

To merge the governing equations for fluid #1 and fluid #2, the merged velocity field, viscoelastic stress tensor, pressure field, and rate of deformation tensor is defined as set forth in (9). The governing equations for the two-phase flow and the boundary condition at the interface can be re-written as (10), (11), and (12), where δ is the Dirac delta function and the density, dynamic viscosity, relaxation time, and solute viscosity are defined in (13). The fact that the surface tension can be written as a body force concentrated at the interface greatly reduces the difficulty solving two-phase fluid flows.

To make the governing equations dimensionless, the definitions in (14) are used, where the primed quantities are dimensionless and L, U, $\rho_1$, $\mu_1$ are respectively the characteristic length, characteristic velocity, density of fluid #1, and solvent dynamic viscosity of fluid #1.

Substituting the definitions in (14) into equations (10), (11), and (12), and dropping the primes, yields the dimensionless governing equations set forth in (15), (16), and (17), in which the density ratio, viscosity ratio, normalized relaxation time, The Reynolds number of the solvent Re, the Weber number We, and the Reynolds number of the solute $Re_p$ are defined by (18).

Since the interface moves with the fluid, the evolution of the level set is governed by the level set convection equation (19). This form is chosen because the interface moves advectively.

Since equations (8), (15), (16), (17), and (19) are expressed in terms of the vector notation, they assume the same form in Cartesian coordinates and axisymmetric coordinates.

II.2 Boundary Conditions and Contact Models

On solid walls, it is assumed that both the normal and tangential components of the velocity vanish, although this assumption must be modified at the triple point. At both inflow and outflow, the formulation allows one to prescribe either the velocity as in (20) or the pressure as in (21). In (21), n denotes the unit normal to the inflow or outflow boundary.

Figure 3:
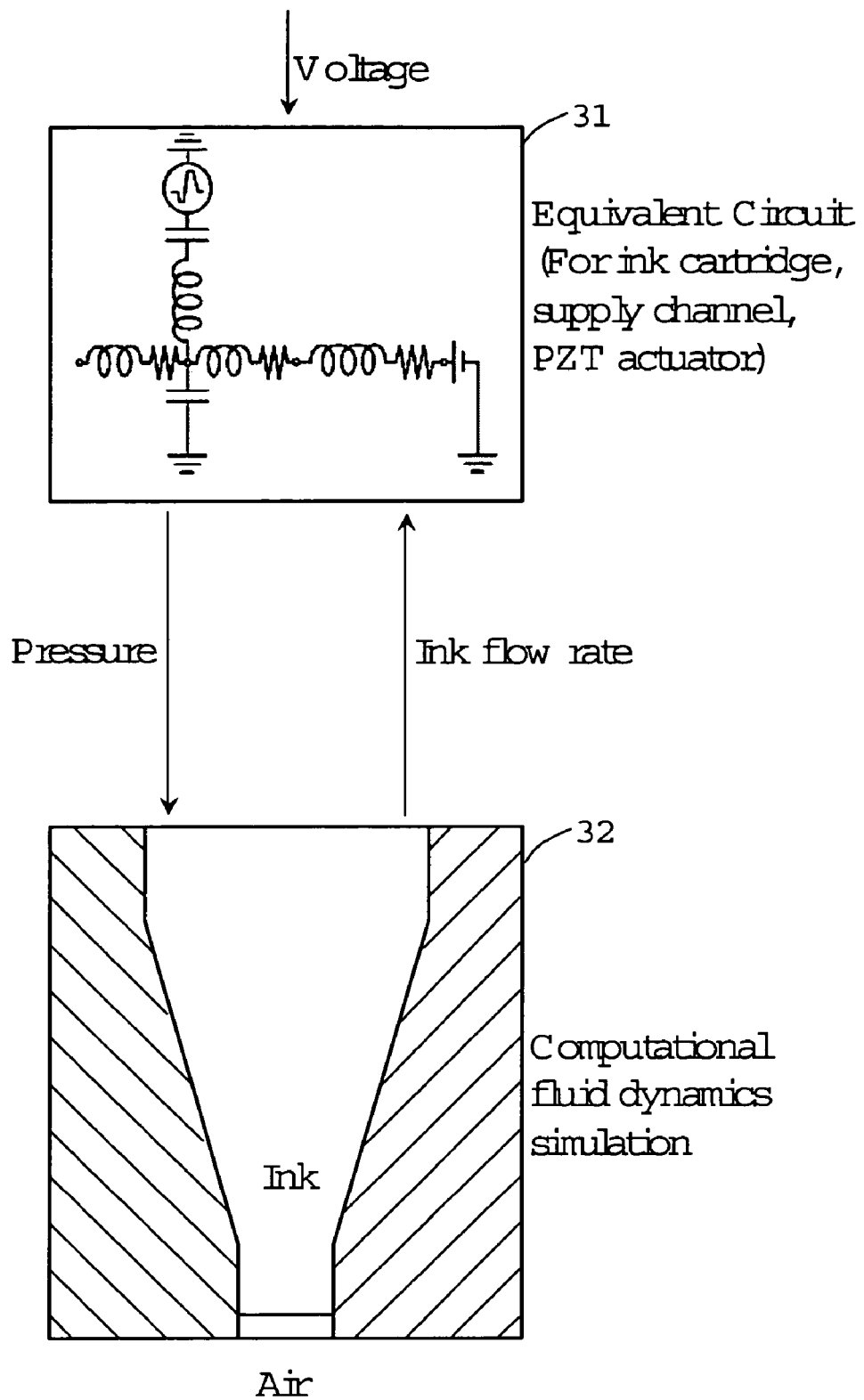
FIG. 3 shows the functional interrelationship between an equivalent circuit and CFD code for performing practical ink-jet simulations.
Figure 6:
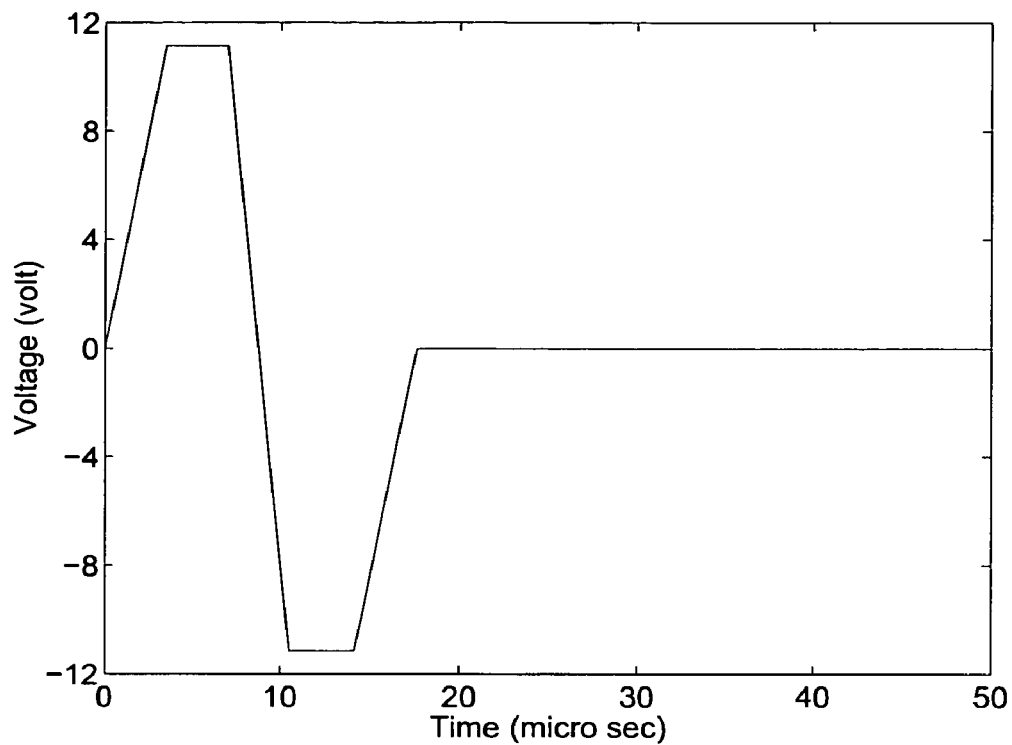
FIG. 6 is a graph showing a typical ink-jet driving voltage as a function of time.
Figure 7:
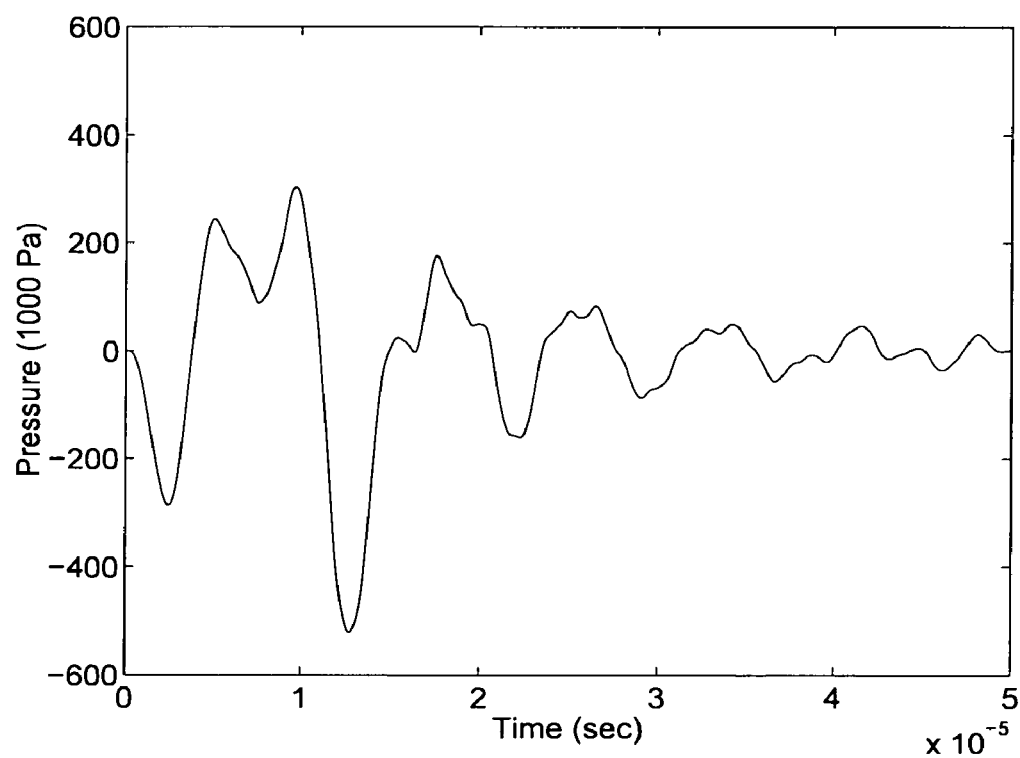
FIG. 7 is a graph showing a typical inflow pressure as a function of time.

To numerically simulate the ejection of ink droplets, one needs to prescribe a velocity or pressure at the inflow to the nozzle. However, only the input voltage to the piezoelectric actuator is known. An equivalent circuit model is employed to handle the problem. An equivalent circuit, which includes the effect of the ink cartridge, supply channel, vibration plate, and piezoelectric (PZT) actuator, simulates the ink velocity and pressure at the nozzle inflow with a given dynamic voltage. FIG. 3 schematically illustrates how a practical ink-jet simulation can be done. Equivalent circuit 31 receives as an input the dynamic voltage to be applied to the piezoelectric PZT actuator and simulates the ink behavior under the influence of ink cartridge, supply channel, vibration plate, and PZT actuator. Circuit 31 calculates an inflow pressure to be applied to the inlet of modeled nozzle 32 and that drives the CFD code. The CFD code then solves the governing partial differential equations for the fluid velocity, pressure, interface position, and viscoelastic stresses, and feeds back the ink flow rate to equivalent circuit 31. The sequence is repeated as long as needed. A typical driving voltage pattern and a typical inflow pressure are as shown in FIGS. 6 and 7 respectively. The driving voltage is such that the ink is first pulled back, pushed and fired, and then pulled back to get ready for the next ejection. The inflow pressure shown in FIG. 7 reflects the reaction of a typical nozzle-ink channel-actuator-cartridge system to the applied voltage. The pressure pattern contains a higher frequency signal. It is the fundamental natural frequency of the system, which is five to six times higher than the driving voltage frequency in this case.

At the triple point, where air and ink meet at the solid wall, the slipping contact line model described in detail in a related application identified by Ser. No. 10/105,138 and filed on Mar. 22, 2002 is used. The contents of this related application are incorporated by reference herein. The contact angle θ is the angle made by the air-liquid interface and the solid, measured from the side of the liquid by approaching the contact line (i.e., the triple point) as close as possible. The advancing critical contact angle $\theta_a$ and receding critical contact angle $\theta_r$ are the respective maximum and minimum contact angles for the triple point to remain static. The velocity $v_B$ is the tangential velocity of the point on the interface at 0.5 μm from the triple point. The triple point is allowed to move toward the side of air if $\theta\geq\theta_a$ and $v_B>0$. The triple point is allowed to move toward the liquid side if $\theta\leq\theta_r$ and $v_B<0$. If the triple point is not allowed to move, the boundary condition at the solid wall is the no-slip condition. If the triple point is allowed to move, the no-slip condition in a close vicinity of the triple point is switched to the free slip condition and an extra surface tension force is added to accelerate the triple point. For one embodiment's dye-based ink and print head nozzle wall, $\theta^a$ and $\theta_r$ are about 70° and 20° respectively.

III. First-Order Numerical Algorithm on Rectangular Grids

In this section, the first algorithm, which is first-order accurate in time and second-order accurate in space, is explained. In the following, the superscript n (or n+1) denotes the time step, as illustrated in equation (24). Given quantities $u^n$, $p^n$, $\phi^n$, $\tau^n$, the purpose is to obtain $u^{n+1}$, $p^{n+1}$, $\phi^{n+1}$, $\tau^{n+1}$ condition of incompressibility (15).

III.1 Temporal Discretization

The boundary condition on the nozzle wall stems from the above-mentioned contact model. The inflow pressure at $t^{n+1}$ is given by the equivalent circuit.

A. Level Set Update

The level set is updated by following (23). The time-centered advection term $[(u \cdot \nabla)\phi]^{n+1/2}$ is evaluated using an explicit predictor-corrector scheme that requires only the available data at $t^n$; the detail is given in section III.2. Once $\phi^{n+1}$ is obtained, $\phi^{n+1/2}$ is computed by using the update rule in (24).

B. Explicit Time Integration for Momentum Equations

The explicit temporal scheme set forth in (25) is used to discretize the momentum equations. If u* is defined as (26), the time-discretized Navier-Stokes equations can be written as (27). I apply a second-order explicit Godunov scheme for the advection term and the central difference for the viscosity term in (26), as explained later. It is clear that the determination of u* needs only values at time step $t^n$.

C. Projection for $u^{n+1}$

To satisfy the incompressibility condition for time step $t^{n+1}$, the divergence operator is applied on both sides of (27). Since $\nabla \cdot u^{n+1} = 0$, the projection equation (28), which is elliptic, is obtained. It reduces to a Poisson equation if the density ratio $\rho(\phi^{n+1/2})$ is a constant. After the pressure $p^{n+1}$ is solved from equation (28), the velocity field $u^{n+1}$ can be obtained by (27).

To simplify the implementation for arbitrary geometries, I use a finite element projection of the form set forth in (29), in which $\psi$ is the finite element weighting function, $\Gamma_1$ denotes all the boundary with inflow or outflow, and $u^{BC}$ is the given inflow or outflow velocity. It is easy to see by the divergence theorem that the implied boundary condition at $\Gamma_1$ is (30).

The choice of the weighting function, as well as the approximation for the pressure and velocity, is flexible. In one implementation, as shown in FIGS. 5a and 5b, the weighting function and the pressure are chosen to be located at grid points and piecewise bilinear, and the velocity be cell-centered and piecewise constant. The inflow velocity, if prescribed, is chosen to be located at the center of each boundary edge.

D. Semi-implicit Algorithm for the Viscoelastic Stresses

In the projection step, both the new pressure and velocity are obtained. The time-centered velocity at cell centers can be calculated by (31).

A semi-implicit algorithm is used to integrate the viscoelastic stress equation in time. The time-discretized, viscoelastic stress equation is set forth in (32), where $u^{n+1/2}$ is the time-centered velocity field at cell centers just obtained in (31). After arranging (32), (33) is obtained.

E. Re-initialization of the Level Set

To correctly capture the interface and accurately calculate the surface tension, the level set function should remain a signed distance function to the interface as the calculations unfold. However, if the level set is updated by (23), it will not remain as such. Instead, the simulation is periodically stopped to recreate a new level set function $\phi$, which is the signed distance function, i.e., $|\nabla \phi| = 1$, without changing the zero level set of the original level set function. Re-initialization can be done, for example, as described in related application Ser. No. 10/729,637, filed on Dec. 5, 2003, and entitled "Selectively Reduced Bi-cubic Interpolation for Ink-Jet Simulations on Quadrilateral Grids," the content of which is incorporated by reference herein.

III.2 Advection Terms in Navier-Stokes and Level Set Equations

Referring to FIGS. 4a and 4b, the velocity components $u_{i,j}^n$ and the level set function values $\phi_{i,j}^n$ are located at cell centers, and the pressure $p_{i,j}^n$ is located at grid points. The time-centered edge velocities and level set function values (also called the "predictors"), such as $u_{i+1/2,j}^{n+1/2}$, $\phi_{i+1/2,j}^{n+1/2}$, and so on, are located at the middle point of each edge. To evaluate the advection terms, equations (34) and (35) are used. In these two equations, the edge velocities and edge level sets are obtained by using a Taylor expansion in space and time. The time derivative $u_t^n$ and $\phi_t^n$ are substituted by the Navier-Stokes equations and the level set convection equation. The procedure involves extrapolating from both sides of the edge and then applying the Godunov type upwinding to decide which extrapolation to use. The foregoing explains how to obtain $u_{i+1/2,j}^{n+1/2}$; the other time-centered edge values may be derived in a similar manner.

At the middle point of a vertical edge, the time-centered edge velocity extrapolated from the left is given in (36), where $F_{i,j}^n$ is defined in (37). The edge velocity extrapolated from the right is given in (38). Note that $u_{i+1/2,j}^{n+1/2,L}$ and $u_{i+1/2,j}^{n+1/2,R}$ are used to denote these two usually different values.

The monotonicity-limited central difference is used for the evaluation of the normal slopes, which is $u_{r,i,j}^n$ in this case. The limiting is done on each component of the velocity at $t^n$ separately. The transverse derivative term is evaluated by first extrapolating u to the transverse faces from the cell center, using normal derivatives only, and then applying the Godunov type upwinding. The details are given later in this subsection.

The next step is the Godunov upwinding. Terms $u_{i+1/2,j}^{n+1/2,L}$ or $u_{i+1/2,j}^{n+1/2,R}$ are chosen according to equations (39) and (40).

These intermediate edge velocities are, in general, not divergence-free. An intermediate marker-and-cell (MAC) projection may be used to make all the normal edge velocities divergence-free. Suppose q is a function, which is smooth enough and $u^e$ represents the edge velocities obtained as in (36)-(40). Equation (41) is to be divergence-free. By taking the divergence of (41), gives (42). By discretizing and solving (42), I can obtain q and make the intermediate edge velocities divergence-free.

Since the MAC projection is applied for edge velocities, let q be cell-centered. Multiplying (42) by r for axi-symmetric coordinates and omitting the superscript n for the level set for simplicity, yields equation (43). Hence, the discretized MAC projection equation in (44) is obtained.

The boundary condition for the intermediate projection should be compatible with the physical boundary conditions. On solid walls, the no flow condition $u \cdot n = 0$ is already used in the construction of the intermediate edge velocity $u^e$; thus, there is a homogeneous Neumann boundary condition on q, namely $\partial q/\partial n = 0$. At the inflow or outflow, if a velocity is prescribed, it is again a homogeneous Neumann boundary condition on q, since the given velocity at $t^{n+1}$ has been included in obtaining $u^e$. If a pressure is given, the corresponding condition on q is as set forth in (45), where the factor 2 in the denominator appears because the edge velocity is time-centered.

A. Evaluation of the Normal Derivatives

The normal derivatives in (36) and (38) can be evaluated using any monotonicity-limited central differences. The method described in this subsection is a fourth-order monotonicity-limited central difference scheme. For a uniform rectangular grid, how to calculate $u_{r,i,j}{}''$ is shown. To begin the difference operator definitions are provided in (47). These operators are then used to define the limiting slope in (48), which is, in turn, used to define the second-order limited slope in (49). The fourth-order limited slope is obtained by using (50). Finally the fourth-order monotonicity-limited normal derivative is simply calculated by (51).

B. Evaluation of the Tangential Derivatives

In Taylor's extrapolations (36) and (38), the normal derivatives are computed using the monotonicity-limited central difference scheme. However, to ensure stability, the tangential derivative should be computed using some sort of upwind schemes. Equation (52) provides one possible approach. In (52), $\hat{u}_{i,j+1/2}$ and $\hat{v}_{i,j+1/2}{}^{adv}$ are again derived from Taylor's extrapolation, from the top and bottom of the edge. Neglecting the pressure, viscosity, and surface tension terms as well as the tangential derivatives, this yields the equations in (53). The derivatives at the right hand side are again computed using the monotonicity-limited central difference described in the previous subsection. Now all that remains is to perform the upwind evaluation to obtain $\hat{u}_{i,j+1/2}$ and $\hat{v}_{i,j+1/2}{}^{adv}$, which is set forth in (54) and (55).

III.3 Spatial Discretizations of Viscoelastic Stress Equations

Terms in the time-discretized equation (33) need to be discretized differently in space. The first term in the square bracket is a convection term. The simple first-order upwind algorithm set forth in (56) is used to evaluate the term on uniform rectangular grids. The second and third terms in the square bracket of equation (33) and the viscosity term are discretized using the central difference.

III.4 Thickness of the Interface

Because of the numerical difficulty caused by the Dirac delta function and by the sharp change of $\rho$ and $\nu$ across the free surface, the Heaviside and Dirac delta functions are replaced by smoothed functions. The Heaviside function is redefined and smoothed as set forth in (57). Accordingly, the smoothed delta function is (58). It is clear that the thickness of the interface is $2\epsilon$ if the level set is a distance function.

In the numerical calculation, the parameter $\epsilon$ is chosen so as to be related to the mesh size by (59), where $\alpha=2$ herein. The thickness of the interface reduces as the mesh is refined. Nonetheless, for any numerically practical choices, the interface will necessarily have some smearing.

III.5 Constraint on Time Step

Since the time integration scheme is 2nd-order explicit for the convection term and 1st-order explicit for viscosity, the constraint on time step $\Delta t$ is determined by the CFL condition, surface tension, viscosity, and total acceleration, as in (60).

IV. Second-Order Numerical Algorithm on Rectangular Grids

The discussion now turns to the second algorithm for two-phase viscoelastic fluid flows. The algorithm is semi-implicit in time and it is second-order accurate in both space and time. Given quantities $u^n$, $p^{n-1/2}$, $\phi^n$, $\tau^n$, the purpose is to obtain $u^{n+1}$, $p^{n+1/2}$, $\phi^{n+1}$, $\tau^{n+1}$ which satisfy the condition of incompressibility (15). It is noted that the pressure lags by one half of a time step to insure the scheme is second-order accurate in time.

IV.1 Temporal Discretization

The boundary condition on the nozzle wall stems from the above-mentioned contact model. The inflow pressure at $t^{n+1}$ is given by the equivalent circuit.

A. Level Set Update

The level set is updated by equation (23). The time-centered advection term is evaluated using an explicit predictor-corrector scheme that requires only the available data at $t^n$. Once $\phi^{n+1}$ is obtained, $\phi^{n+1/2}$ is computed by using equation (24). The level set update for this second-order accurate in time algorithm is the same as that of the first-order in time algorithm presented in the previous section.

B. Semi-implicit Time Integration for Momentum Equations

For a semi-implicit temporal scheme, it is desired to discretely satisfy the momentum equations and continuity equation in the way set forth in (61) and (62). However, it is not easy to solve this time-discretized system. Instead, the momentum equations are integrated as follows. The tentative velocity $u^{**}$ defined in (63) is first calculated. Then the viscosity term is inverted to obtain the non-divergence-free velocity predictor $u^*$ by solving (64) and (65). This step insures the viscosity term is semi-implicit and increases code stability. Before doing the projection, the pressure contribution is deducted from the velocity predictor, as set forth in (66). This step is to make sure that the whole velocity field is projected to obtain the whole pressure. Finally solve the projection equation (67) by enforcing the incompressibility condition at $t^{n+1}$.

In (63), a second-order explicit Godunov method is applied for the advection term, and the central difference for the viscosity term and surface tension term. It is noted that the viscoelastic stress term is evaluated at $t^{n+1/2}$. The time-centered cell edge viscoelastic stresses are first obtained by Taylor's expansion and Godunov upwinding. The central difference is then employed to evaluate the divergence. This will be explained next.

C. Projection for $u^{n+1}$

To satisfy the incompressibility condition for time step $t^{n+1}$, the divergence operator is applied on both sides of (67). Since $\nabla \cdot u^{n+1}=0$, equation (68) results. After the pressure $p^{n+1/2}$ is solved from equation (68), the velocity field $u^{n+1}$ can be obtained by (67).

To simplify the implementation for arbitrary geometries, the finite element projection in equation (29) is used. The projection step for the second-order algorithm is the same as that of the first-order algorithm in subsection III.1.C, except that the second-order algorithm has $p^{n+1/2}$ instead of $p^{n+1}$.

D. Mixed Algorithm for the Viscoelastic Stresses

An algorithm, which is explicit on the advection term, semi-implicit on the viscosity term, and implicit on the relaxation term is used to integrate the viscoelastic stress in time. The viscoelastic stress equation is discretized as set forth in (69), where $u^{n+1/2}$ and $\tau^{n+1/2}$ are the time-centered cell edge velocity and viscoelastic stress tensor to be determined by Taylor's expansion and Godunov upwinding. After arrangement, equation (69) can be rewritten as (70).

E. Re-initialization of the Level Set

To correctly capture the interface and accurately calculate the surface tension, the level set function should remain a signed distance function to the interface as the calculations unfold. However, if the level set is updated by (23), it will not remain as such. Instead, the simulation is periodically stopped and a new level set function $\phi$ recreated, which is the signed distance function, i.e. $|\nabla\phi|=1$, without changing the zero level set of the original level set function. A re-initialization algorithm for performing re-initialization in the present invention can be found in related application Ser. No. 10/729,637, filed on Dec. 5, 2003, and entitled "Selectively Reduced Bi-cubic Interpolation for Ink-Jet Simulations on Quadrilateral Grids," the content of which is incorporated by reference herein. Other known and suitable re-initialization techniques may also be used.

IV.2 Advection Terms in Navier-Stokes and Level Set Equations

The handling of the advection terms in the Navier-Stokes equations and level set equation is exactly the same as the first algorithm, which is presented in subsection III.2.

IV.3 Spatial Discretizations of Viscoelastic Stress Equations

A. Evaluation of the Advection Term

Referring to FIGS. 4a and 4b, the viscoelastic stress tensor $\tau_{i,j}^n$ is co-located with velocity at cell centers. The time-centered stress tensor (also called the "stress predictor"), $\tau_{i+1/2,j}^{n+1/2}$, is located at the middle point of each cell edge. To evaluate the advection term in the equation (70), equation (71) is employed. In equation (71), the time-centered edge stress tensor is obtained by doing a Taylor expansion on $\tau$ in space and time. The time derivative $\tau_t^n$ is substituted by the viscoelastic stress equation. The procedure involves extrapolating from both sides of the edge and then applying the Godunov type upwinding to decide which extrapolation to use. The following explains in detail how to obtain $\tau_{i+1/2,j}^{n+1/2}$; the other time-centered edge values may be obtained in a similar manner.

At the middle point of a vertical edge, the time-centered edge viscoelastic stress tensor extrapolated from the left is given in (72), where $G_{i,j}^n$ is defined in (73). The edge stress tensor extrapolated from the right is given in (74). Note that $\tau_{i+1/2,j}^{n+1/2,L}$ and $\tau_{i+1/2,j}^{n+1/2,R}$ are used to denote these two different values.

The monotonicity-limited central difference is used for the evaluation of the normal slopes, which are $\tau_{r,i,j}^n$ and $\tau_{r,i+1,j}^n$ in this case. The limiting is done on each component of the viscoelastic stress at $t^n$ separately. The transverse derivative term is evaluated by first extrapolating $\tau$ to the transverse faces from the cell center, using normal derivatives only, and then applying the Godunov type upwinding. The details of the procedure are similar to that described in subsections III.2.A and III.2.B.

The next step is the Godunov upwinding. $\tau_{i+1/2,j}^{n+1/2,L}$ or $\tau_{i+1/2,j}^{n+1/2,R}$ is chosen to be the time-centered edge value according to (75). The obtained time-centered edge stresses are put into (71) for the calculation of the convection term in equation (70).

B. Evaluation of the Upper-convected Derivative Term

To illustrate how the second and third terms of the upper-convected derivative are evaluated using the time-centered cell edge velocities and viscoelastic stress tensor, these derivatives are expanded. Since these two terms are similar, the expansion is described for only one term here. In axisymmetric coordinate systems, the first term of the upper-convected derivative can be expanded and expressed in the dyadic form set forth in (76). The value of the upper-convected terms is evaluated at cell centers by the use of central differences and the time-centered cell edge stresses. Omitting the superscript n+½ for simplicity gives the discretized terms set forth in (77).

C. The Divergence of Viscoelastic Stresses

The divergence of the viscoelastic stresses in (63) is evaluated using the time-centered edge stresses. To illustrate this, the divergence is first expanded as in (78). The divergence is evaluated at cell centers by use of the time-centered cell edge values and the central difference. The discretized terms of (78) are given in (79).

IV.4 Interface Thickness and Time Step Constraint

Because of the numerical difficulty caused by the Dirac delta function and by the sharp change of $\rho$, $\upsilon$, and $\lambda$ across the free surface, the Heaviside and Dirac delta functions are replaced by smoothed functions as explained in subsection III.4.

Since the time integration scheme is 2nd-order explicit in time, the constraint on time step $\Delta t$ is determined by the CFL condition, surface tension, viscosity, and total acceleration, as in equation (60).

V. Numerical Example

For a numerical example of viscoelastic ink-jet simulation, consider a typical nozzle as in FIG. 1. The diameter is 25 microns at the exit opening and 49.5 microns at the bottom. The length of the nozzle opening part, where the diameter is 25 microns, is 26 microns. The slant part is 55 microns in length, and the bottom part is 7.5 microns long.

The inflow pressure is given by an equivalent circuit, which simulates the effect of the ink cartridge, supply channel, vibration plate, PZT actuator, applied voltage, and the ink inside the channel and cartridge. Assume that the input dynamic voltage is as shown in FIG. 6 with the peak voltage at ±11.15 volts. The corresponding inflow pressure for each simulated cases will be shown together with the droplet shapes. The outflow pressure at the top of the solution domain is set to zero.

Figure 8:
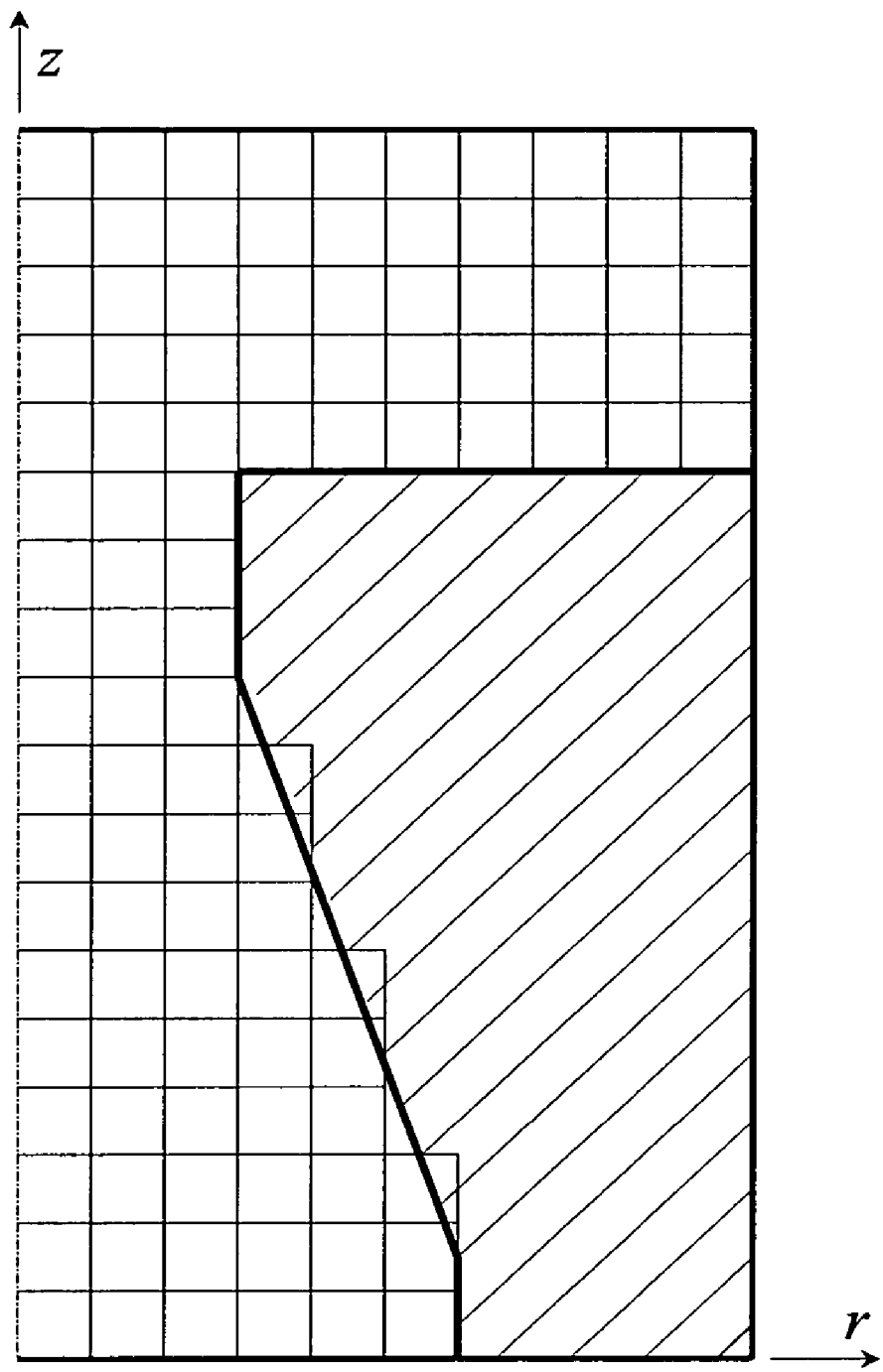
FIG. 8 is a schematic diagram of a modeled ink-jet nozzle showing the zig-zag pattern due to the use of uniform rectangular mesh.
Figure 9:
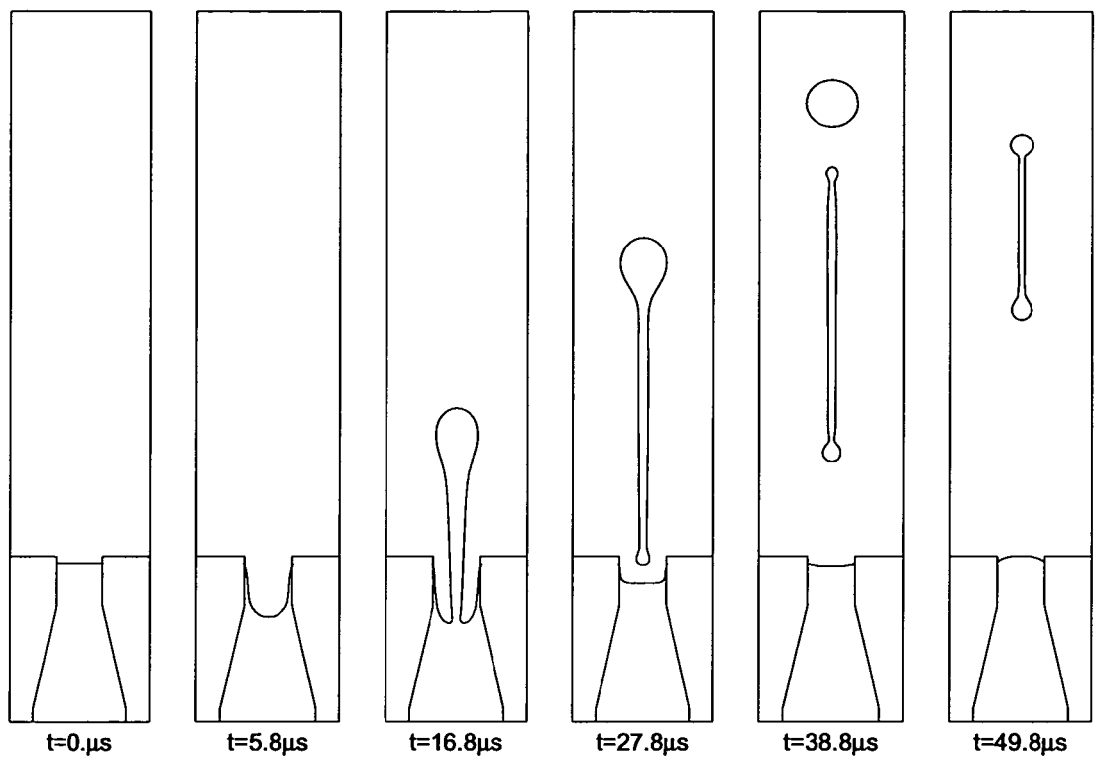
FIG. 9 shows a simulation result of the ejection of a Newtonian ink droplet ($\lambda_1=0$)
Figure 10:
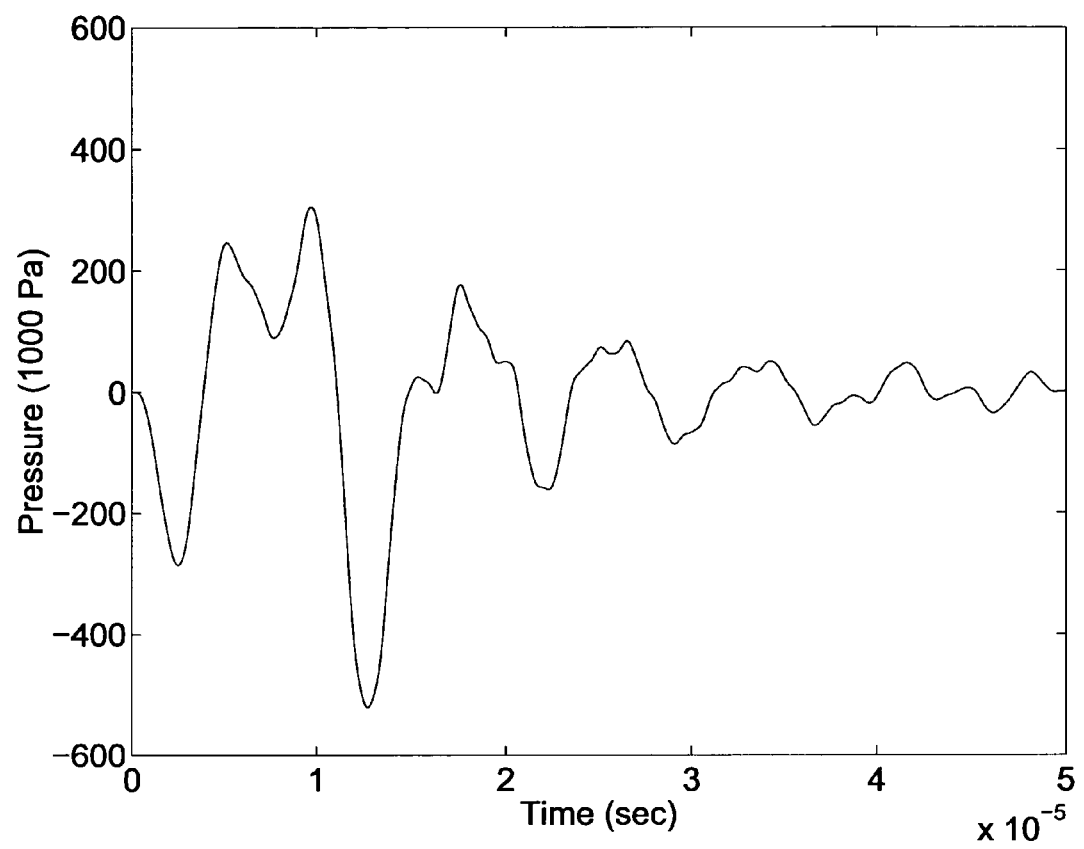
FIG. 10 is a graph showing the corresponding inflow pressure vs. time of the simulation result in FIG. 9 ($\lambda_1=0$)
Figure 11:
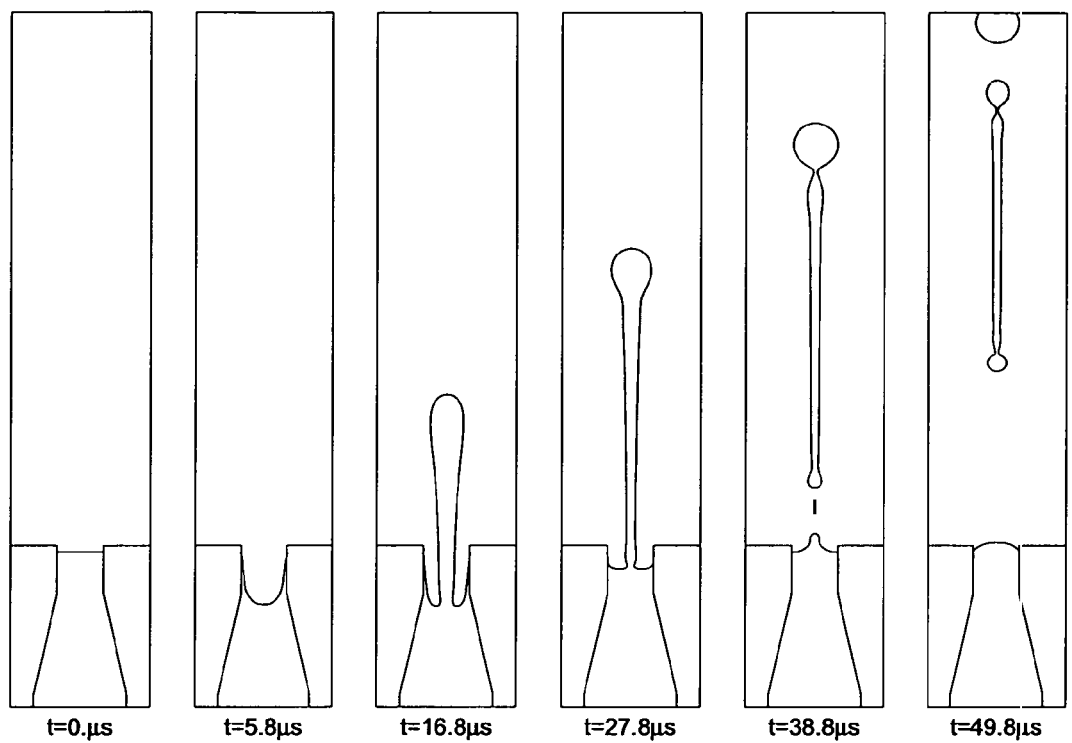
FIG. 11 shows a simulation result of the ejection of a viscoelastic ink droplet ($\lambda_1=0.4$)
Figure 12:
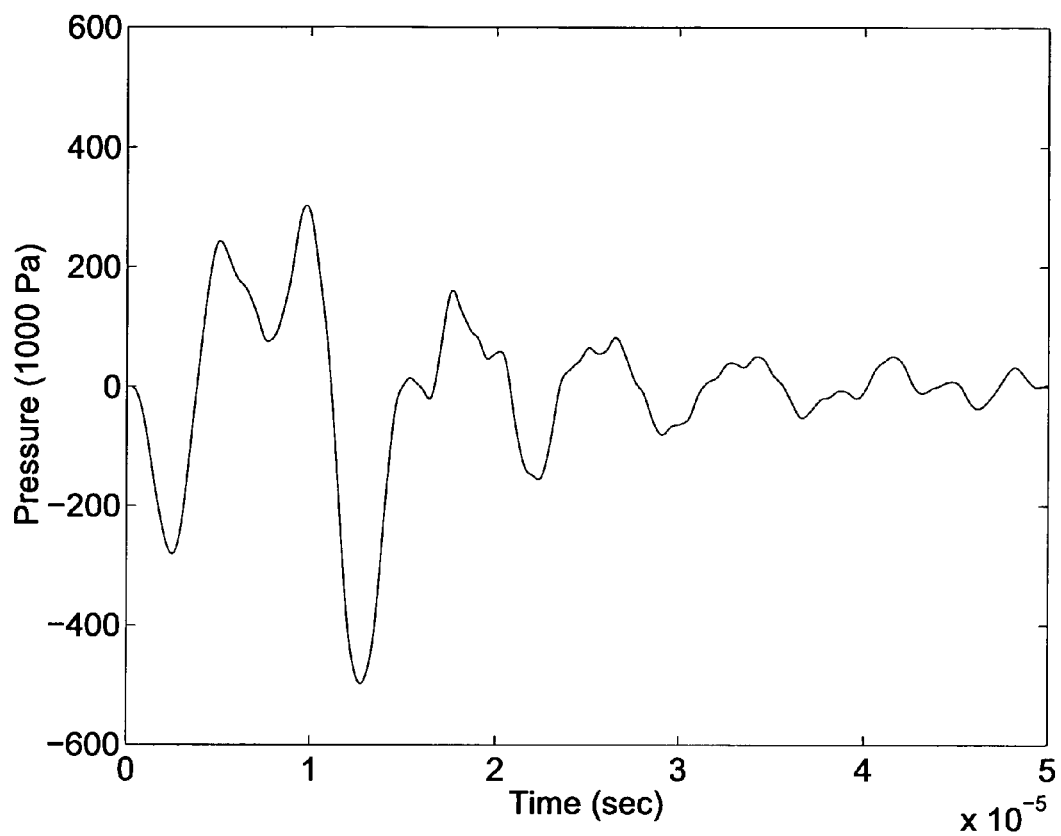
FIG. 12 is a graph showing the corresponding inflow pressure vs. time of the simulation result in FIG. 11 ($\lambda_1=0.4$)

The solution domain was chosen to be $\{(r,z)|0 \leq r \leq 27.3$ μm, $0 \leq z \leq 379.7$ μm$\}$. Since the slant part of the nozzle wall is not parallel to the coordinate axes, the "method of obstacle cells" is applied, and uniform rectangular cells are employed in discretizing the nozzle geometry. As a result the nozzle wall has a staircase pattern, as shown in FIG. 8. A better approximation would result from using a body-fitted quadrilateral mesh. However, the difference between using a staircase representation vs. a body-fitted mesh, while important for small-scale boundary effects, is not significant in terms of computing the pinch-off time, bubble velocity, and satellite formation.

The advancing and receding contact angles are taken to be 70° and 20°, respectively. The initial meniscus is assumed to be flat and 3.5 microns lower than the nozzle opening.

For the purpose of normalization, the nozzle opening diameter (25 microns) is chosen to be the length scale and 6 m/sec is the velocity scale. The normalized solution domain is hence $\{(r,z)|0 \leq r \leq 1.09, 0 \leq z \leq 15.19$ μm$\}$. The density, solvent viscosity, solute viscosity, and surface tension of the ink under consideration are as given in (80). The non-dimensional parameters, i.e., Reynolds number of the solvent, Weber number, and Reynolds number of the solute, are set forth in (81). The density and viscosity of air that are used in the numerical example are listed in (82).

Simulation results including the droplet shapes and inflow pressures for inks of various relative relaxation times $\lambda=0$, 0.4, 1, 3 are plotted in FIG. 9 to FIG. 16. The case with $\lambda=0$ is just that of Newtonian ink with a dynamic viscosity $\mu^l=3.566\times10^{-3}$ Kg/m·sec. It is noted that the major droplet in the last graph of FIG. 9 has already passed the end of the solution domain at t=49.8 μs, and hence cannot be seen.

Figure 13:
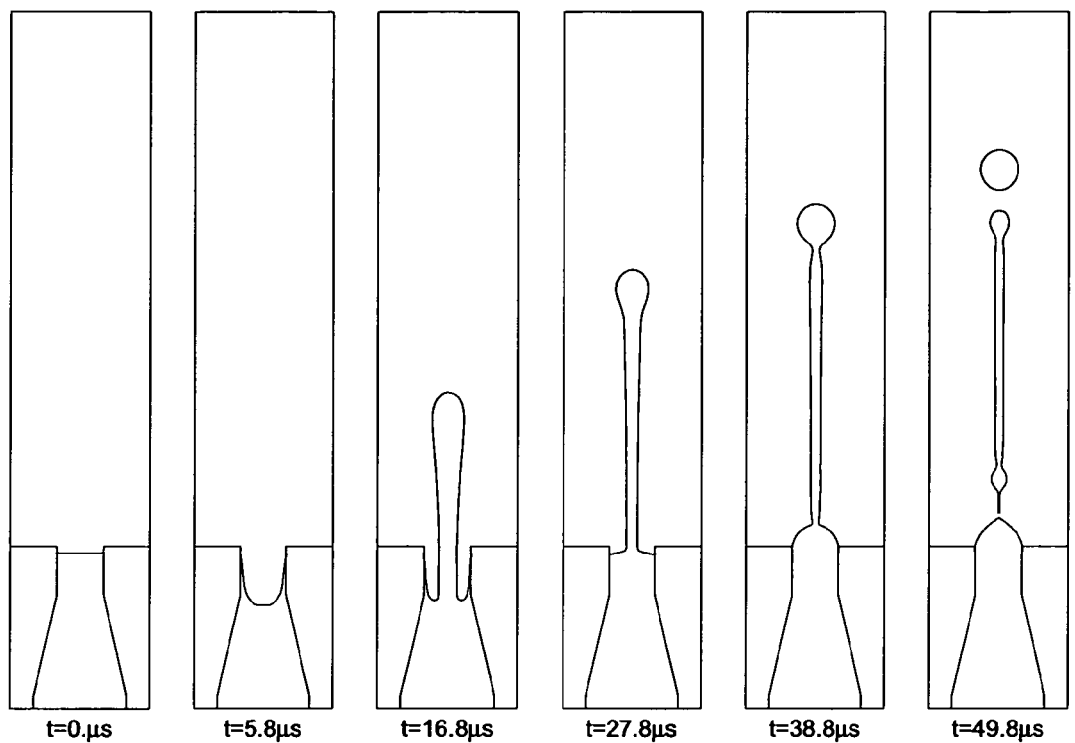
FIG. 13 shows a simulation result of the ejection of a viscoelastic ink droplet ($\lambda_1=1.0$)
Figure 14:
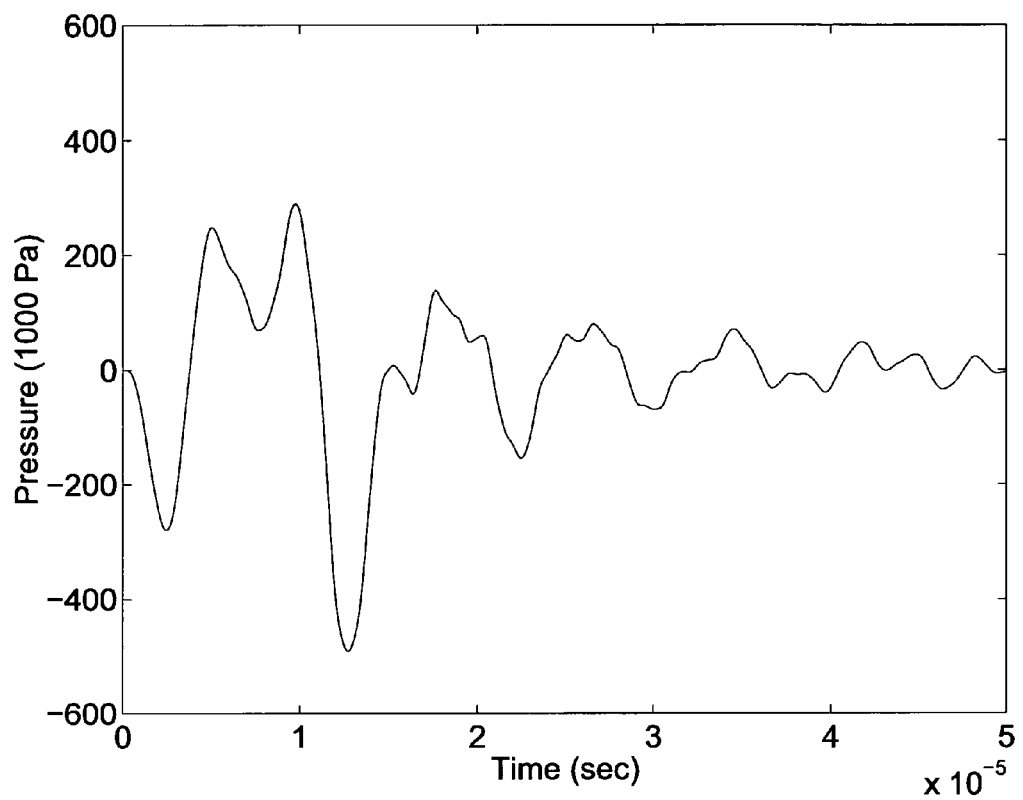
FIG. 14 is a graph showing the corresponding inflow pressure vs. time of the simulation result in FIG. 13 ($\lambda_1=1.0$)
Figure 15:
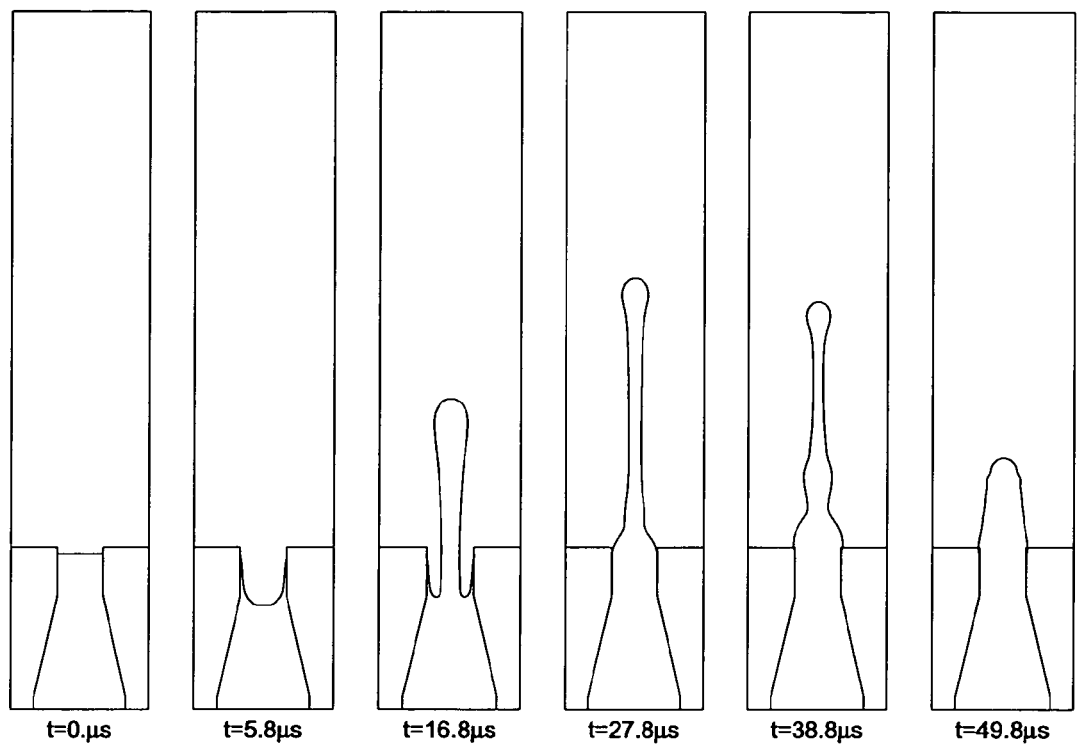
FIG. 15 shows a simulation result of the ejection of a viscoelastic ink droplet ($\lambda_1=3.0$)
Figure 16:
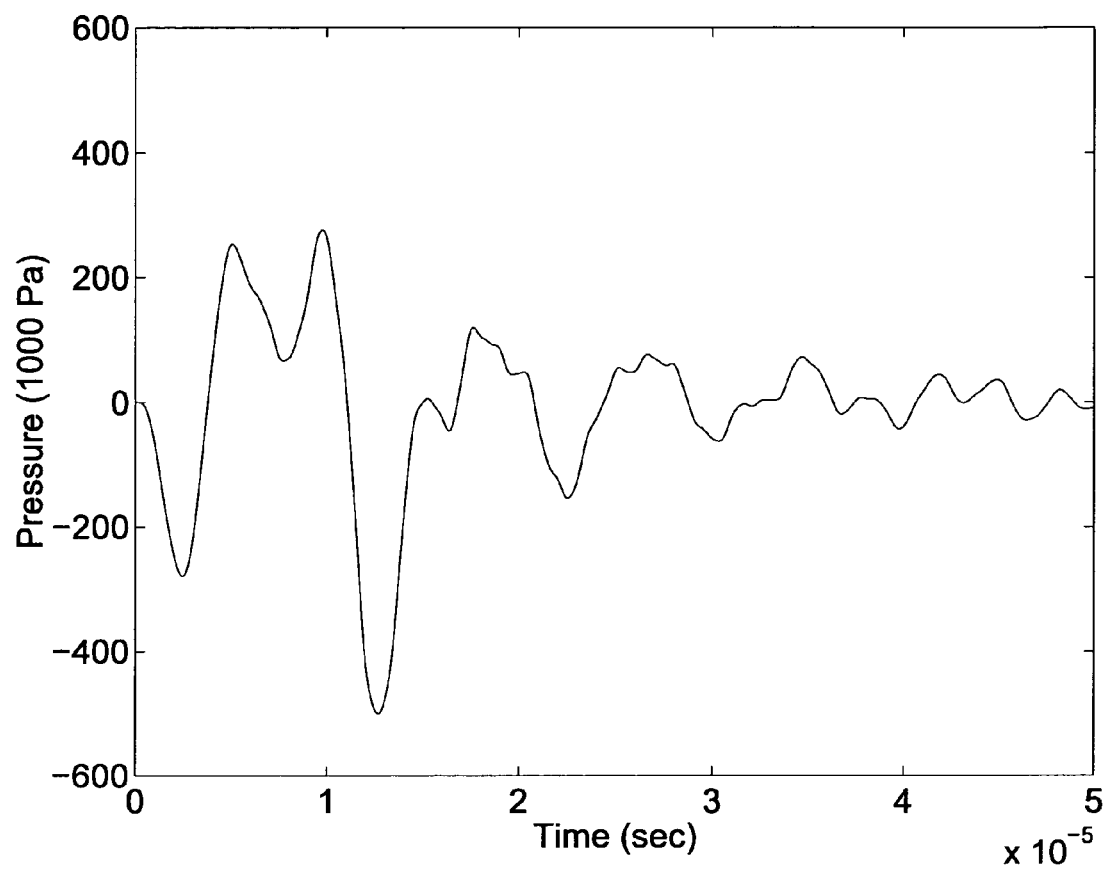
FIG. 16 is a graph of the corresponding inflow pressure vs. time of the simulation result in FIG. 15 ($\lambda_1=3.0$)

Comparing results in FIG. 9 to FIG. 16, it can be seen that, although ink elasticity does not change the inflow pressure by much, it can dramatically influence the droplet speed and size. The results in FIG. 13 and FIG. 15 show that, at a given peak voltage and dynamic pattern, the ink droplet cannot be ejected when λ>1. To eject highly viscoelastic inks, one has to either apply higher peak voltage or develop new dynamic voltage patterns.

VI. Implementations

As the foregoing demonstrates, the present invention provides two coupled finite difference algorithms on rectangular grids for two-phase viscoelastic ink-jet simulations that incorporate the level set projection method for incompressible two-phase immiscible fluid flows, the Godunov type scheme for convection terms in the momentum and level set equations, and the central difference scheme for other terms in the equations. An equivalent circuit model simulates inflow pressure (or flow rate). The first algorithm incorporates the first-order upwind scheme for the convection term in viscoelastic stress equation, while the second algorithm employs a second-order Godunov type upwind method for the convection term in the viscoelastic stress equation.

Figure 17:
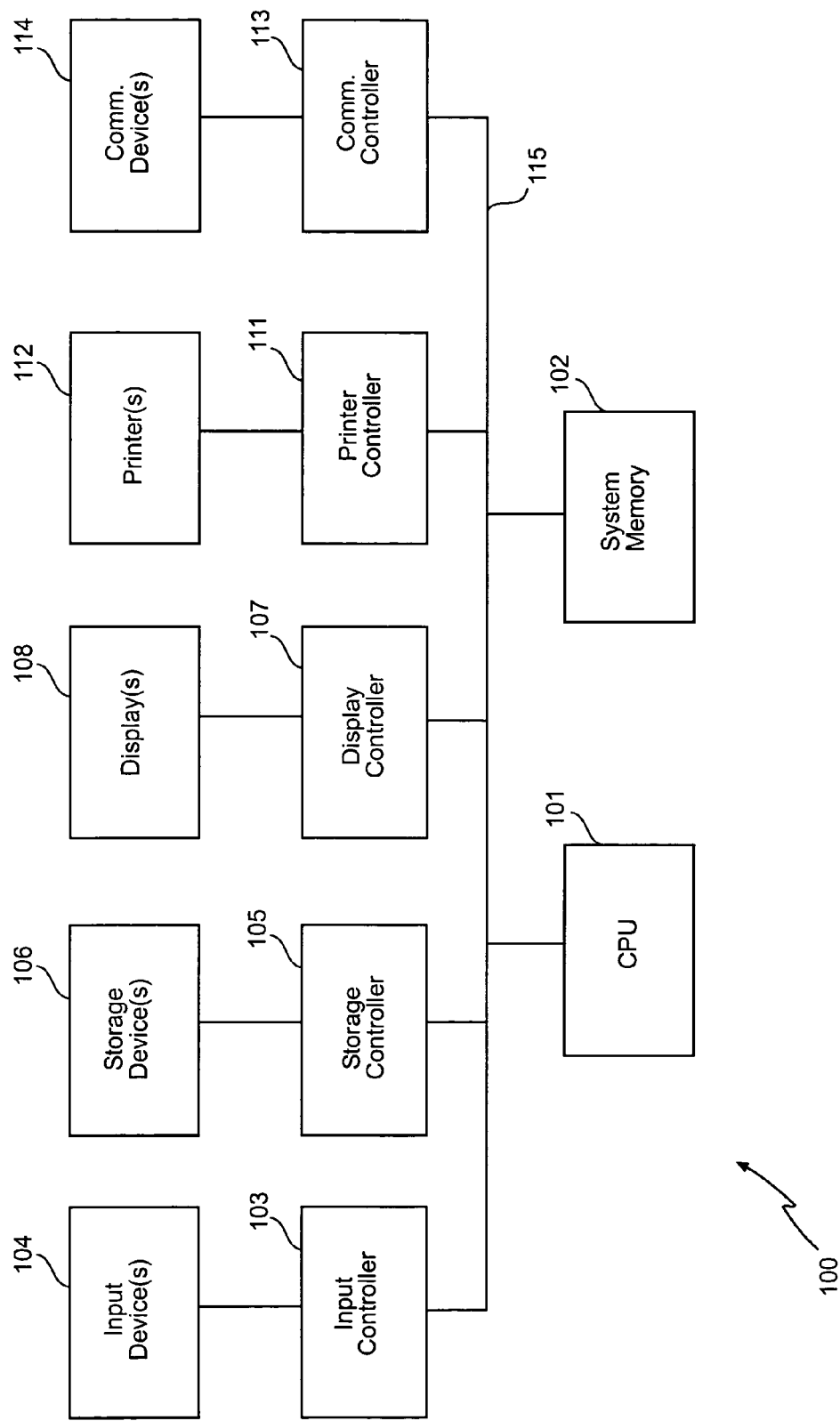
FIG. 17 is a schematic diagram of an exemplary system that may be used to implement embodiments of the invention

Having described the details of the invention, the discussion now turns to an exemplary system that may be used to implement the invention. Such a system 100 is shown in FIG. 17. As illustrated in FIG. 17, the system, which may be a computer or workstation, includes a central processing unit (CPU) 101 that provides computing resources and controls the system. CPU 101 may be implemented with a microprocessor or the like, and may represent more than one CPU, and may also include one or more auxiliary chips such as a graphics processor. System 100 further includes system memory 102, which may be in the form of random-access memory (RAM) and read-only memory (ROM).

A number of controllers and peripheral devices are also provided, as shown in FIG. 17. Input controller 103 represents an interface to various input devices 104, such as a keyboard, mouse, and/or stylus. A storage controller 105 interfaces with one or more storage devices 106, each of which includes a storage medium such as magnetic tape or disk, or an optical medium that may be used to record programs of instructions for operating systems, utilities and applications, which may include embodiments of programs that implement various aspects of the present invention. Storage device(s) 106 may also be used to store processed or to-be-processed data in accordance with the invention. A display controller 107 provides an interface to display device(s) 108, which may be of any known type, for viewing a simulation performed in accordance with the invention. A printer 112 that communicates with the system through a printer controller 111 can be used to print out simulation results. A communications controller 113 interfaces with one or more communication devices 114 that enables system 100 to connect to remote devices through any of a variety of networks including the Internet, a local area network (LAN), a wide area network (WAN), or through any suitable electromagnetic carrier signals including infrared signals.

In the illustrated system, all major system components connect to bus 115, which may represent more than one physical bus. However, various system components may or may not be in physical proximity to one another. For example, input data and/or output data may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, network signals, or any other suitable electromagnetic carrier signals including infrared signals.

As previously noted, the algorithms of the present invention may be conveniently implemented with software, e.g., in Fortran or C language. Of course, the implementation is not limited to those two programming languages, and indeed is not limited to just software. Either a hardware or a software/hardware implementation is also possible. Hardware-implemented functions may be realized using ASIC(s), digital signal processing circuitry, or the like. Accordingly, the phrase "modules or components" in the claims is intended to cover both software and hardware implementations. Similarly, the term "medium" as used herein encompasses software, hardware having a program of instructions hardwired thereon, or combination thereof. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

What is claimed is:

1. A computer-implemented method of designing ink-jet print heads by simulating and analyzing viscoelastic fluid flow through, and ejection from, a channel having a boundary between a first fluid that flows through the channel and a second fluid, the method comprising:
   (a) performing finite difference analysis to solve, equations governing the viscoelastic flow of the first fluid through the channel, including viscoelastic stress equations, the finite difference analysis being performed by an algorithm that is explicit on an advection term, semi-implicit on a viscosity term, and implicit on a relaxation term, the finite difference analysis being performed to simulate the flow of the first fluid through, and ejection from, the channel; and
   (b) updating, periodically during the simulation, a level set function for the first and second fluids, wherein the level set function describes the position of the boundary between the first and second fluids, and the evolution of the level set function over time describes the shape and position of boundary as the first fluid is ejected from the channel; and
   (c) designing ink-jet print heads using the results of the simulation of the viscoelastic fluid flow.

2. The method of claim 1, wherein the first fluid is viscoelastic ink, the second fluid is air, and the channel comprises an ink-jet nozzle that is part of a piezoelectric ink-jet head.

3. The method of claim 1, wherein a level set projection method is also performed to solve the equations governing the viscoelastic flow of the first fluid.

4. The method of claim 1, wherein the advection term of the stress tensor is evaluated using a Taylor expansion in both space and time, wherein the viscoelastic stress tensor is extrapolated in space from both the right and the left and a Godunov type upwinding is used to choose which extrapolation is evaluated.

5. The method of claim 4, wherein:
   the calculation of the spatially extrapolated viscoelastic stress tensor further comprises the evaluation of the normal slope of the viscoelastic stress tensor; and a monotonicity-limited central difference method is used to evaluate the normal slope of the viscoelastic stress tensor.

6. The method of claim 1, wherein evaluating the relaxation term implicitly includes modifying the viscoelastic stress equation which describes the evolution of the viscoelastic stress over time, wherein:

the viscoelastic stress equation is discretized in time to form a time discretized viscoelastic stress equation that describes the evolution of the viscoelastic stress from a first point in time to a second point in time;

the relaxation term is a function of at least the viscoelastic relaxation time of the first fluid;

a viscoelastic stress tensor is evaluated at the second point in time; and the time discretized viscoelastic stress equation is algebraically modified such that the viscoelastic stress tensor at a second point in time is described relative to viscoelastic stress tensor at the first point in time.

7. The method of claim 6, wherein the relaxation term is also a function of a level set function.

8. The method of claim 1, wherein evaluating the viscosity term semi-implicitly includes modifying the viscoelastic stress equation which describes the evolution of the viscoelastic stress over time, wherein:

the viscoelastic stress equation is discretized in time to form a time discretized viscoelastic stress equation that describes the evolution of the viscoelastic stress from a first point in time to a second point in time; and the viscosity term is a function of the viscosity and the velocity of the fluid evaluated at the first point in time and the second point in time.

9. The method of claim 8, wherein the viscosity term is also a function of a level set function.

10. A computer-readable storage medium storing computer executable instructions which when executed on a computing device perform a method of designing ink-jet print heads by simulating and analyzing viscoelastic fluid flow through, and ejection from, a channel having a boundary between a first fluid that flows through the channel and a second fluid, the medium comprising instructions for:

(a) performing finite difference analysis to solve equations governing the viscoelastic flow of the first fluid through the channel, including viscoelastic stress equations, the finite difference analysis being performed by an algorithm that is explicit on an advection term, semi-implicit on a viscosity term, and implicit on a relaxation term, the finite difference analysis being performed to simulate the flow of the first fluid through, and ejection from, the channel; and (b) updating, periodically during the simulation, a level set function for the first and second fluids, wherein the level set function describes the position of the boundary between the first and second fluids, and the evolution of the level set function over time describes the shape and position of boundary as the first fluid is ejected from the channel; and (c) designing ink-jet print heads using the results of the simulation of the viscoelastic fluid flow.

* * * * *

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 1 of 17 --Appendix--

Appendix

$$\frac{d\tau}{dt} + \frac{G}{\mu}\tau = s, \qquad (1)$$

$$\tau = \mu s. \qquad (2)$$

$$\rho_1 \frac{Du_1}{Dt} = -\nabla p_1 + \nabla \cdot (2\mu_1 \mathcal{D}_1) + \nabla \cdot \tau_1, \qquad \nabla \cdot u_1 = 0,$$

$$\frac{D\tau_1}{Dt} = \tau_1 \cdot (\nabla u_1) + (\nabla u_1)^T \cdot \tau_1 - \frac{1}{\lambda_1}(\tau_1 - 2\mu_{p1}\mathcal{D}_1). \qquad (3)$$

$$\rho_2 \frac{Du_2}{Dt} = -\nabla p_2 + \nabla \cdot (2\mu_2 \mathcal{D}_2), \qquad \nabla \cdot u_2 = 0. \qquad (4)$$

$$\mathcal{D}_i = \frac{1}{2}\left[\nabla u_i + (\nabla u_i)^T\right], \qquad i = 1,2,$$

$$u_i = u_i e_r + v_i e_z, \qquad i = 1,2 \qquad (5)$$

$$(2\mu_1\mathcal{D}_1 - 2\mu_2\mathcal{D}_2) \cdot n = (p_1 - p_2 + \sigma\kappa)n, \qquad (6)$$

$$\phi(r,z,t) \begin{cases} < 0 & \text{if } (r,z) \in \text{fluid\#2(air)} \\ = 0 & \text{if } (r,z) \in \text{interface} \\ > 0 & \text{if } (r,z) \in \text{fluid\#1(ink)} \end{cases} \qquad (7)$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 2 of 17 --Appendix--

$$n = \frac{\nabla \phi}{|\nabla \phi|}\bigg|_{\phi=0},$$

$$\kappa = \nabla \cdot \left(\frac{\nabla \phi}{|\nabla \phi|}\right)\bigg|_{\phi=0}. \tag{8}$$

$$u = \begin{cases} u_1, \phi > 0 \\ u_2, \phi < 0, \end{cases} \quad \tau = \begin{cases} \tau_1, \phi > 0 \\ 0, \phi < 0, \end{cases} \quad p = \begin{cases} p_1, \phi > 0 \\ p_2, \phi < 0, \end{cases} \quad \mathcal{D} = \begin{cases} \mathcal{D}_1, \phi > 0 \\ \mathcal{D}_2, \phi < 0. \end{cases} \tag{9}$$

$$\nabla \cdot u = 0, \tag{10}$$

$$\rho(\phi)\frac{Du}{Dt} = -\nabla p + \nabla \cdot (2\mu(\phi)\mathcal{D}) + \nabla \cdot \tau - \sigma\kappa(\phi)\delta(\phi)\nabla\phi, \tag{11}$$

$$\frac{D\tau}{Dt} = \tau \cdot (\nabla u) + (\nabla u)^T \cdot \tau - \frac{1}{\lambda(\phi)}\left(\tau - 2\mu_p(\phi)\mathcal{D}\right), \tag{12}$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 3 of 17 --Appendix--

-- 
$$\rho(\phi) = \begin{cases} \rho_1 & \text{if } \phi \geq 0 \\ \rho_2 & \text{if } \phi < 0, \end{cases}$$

$$\mu(\phi) = \begin{cases} \mu_1 & \text{if } \phi \geq 0 \\ \mu_2 & \text{if } \phi < 0, \end{cases}$$

$$\lambda(\phi) = \begin{cases} \lambda_1 & \text{if } \phi \geq 0 \\ 0 & \text{if } \phi < 0, \end{cases} \quad (13)$$

$$\mu_p(\phi) = \begin{cases} \mu_{p1} & \text{if } \phi \geq 0 \\ 0 & \text{if } \phi < 0. \end{cases}$$

$$x = Lx', \quad y = Ly', \quad t = \frac{L}{U}t',$$

$$p = \rho_1 U^2 p', \quad \mathbf{u} = U\mathbf{u}', \quad \boldsymbol{\tau} = \rho_1 U^2 \boldsymbol{\tau}', \quad (14)$$

$$\rho = \rho_1 \rho', \quad \mu = \mu_1 \mu', \quad \lambda = \frac{L}{U}\lambda', \quad \mu_p = \mu_1 \mu_p',$$

$$\nabla \cdot \mathbf{u} = 0, \quad (15)$$

$$\frac{D\mathbf{u}}{Dt} = -\frac{1}{\rho(\phi)}\nabla p + \frac{1}{\rho(\phi)Re}\nabla \cdot (2\mu(\phi)\mathcal{D}) - \frac{1}{\rho(\phi)We}\kappa(\phi)\delta(\phi)\nabla\phi + \nabla \cdot \boldsymbol{\tau}, \quad (16)$$
--

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 4 of 17 --Appendix--

$$\frac{D\tau}{Dt} = \tau \cdot (\nabla u) + (\nabla u)^T \cdot \tau - \frac{1}{\lambda(\phi)}\left(\tau - 2\frac{\mu_p(\phi)}{Re_p}\mathcal{D}\right), \tag{17}$$

$$\rho(\phi) = \begin{cases} 1 & \text{if } \phi \geq 0 \\ \rho_2/\rho_1 & \text{if } \phi < 0 \end{cases},$$

$$\mu(\phi) = \begin{cases} 1 & \text{if } \phi \geq 0 \\ \mu_2/\mu_1 & \text{if } \phi < 0 \end{cases},$$

$$\lambda(\phi) = \begin{cases} 1 & \text{if } \phi \geq 0 \\ 0 & \text{if } \phi < 0 \end{cases},$$

$$Re = \frac{\rho_1 U L}{\mu_1},$$

$$We = \frac{\rho_1 U^2 L}{\sigma},$$

$$Re_p = \frac{\rho_1 U L}{\mu_{p1}}, \tag{18}$$

$$\frac{\partial \phi}{\partial t} + u \cdot \nabla \phi = 0. \tag{19}$$

$$u = u^{BC} \tag{20}$$

$$p = p^{BC}, \quad \frac{\partial u}{\partial n} = 0, \tag{21}$$

--

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 5 of 17 --Appendix--

--

$$u^n = u(t = n\Delta t) \qquad (22)$$

$$\phi^{n+1} = \phi^n - \Delta t [u \cdot \nabla \phi]^{n+1/2}. \qquad (23)$$

$$\phi^{n+1/2} = \frac{1}{2}\left(\phi^n + \phi^{n+1}\right). \qquad (24)$$

$$\frac{u^{n+1} - u^n}{\Delta t} + \left[(u \cdot \nabla)u\right]^{n+1/2}$$
$$= -\frac{1}{\rho(\phi^{n+1/2})}\nabla p^{n+1} + \frac{1}{\rho(\phi^{n+1/2})Re}\nabla \cdot \left[2\mu(\phi^{n+1/2})\mathcal{D}^n\right] \qquad (25)$$
$$+ \nabla \cdot \tau^n - \frac{1}{\rho(\phi^{n+1/2})We}\left[\kappa(\phi)\delta(\phi)\nabla\phi\right]^{n+1/2}.$$

$$u^* = u^n + \Delta t \left\{ -\left[(u \cdot \nabla)u\right]^{n+1/2} + \frac{1}{\rho(\phi^{n+1/2})Re}\nabla \cdot \left[2\mu(\phi^{n+1/2})\mathcal{D}^n\right] \right.$$
$$\left. \nabla \cdot \tau^n - \frac{1}{\rho(\phi^{n+1/2})We}\left[\kappa(\phi)\delta(\phi)\nabla\phi\right]^{n+1/2} \right\}, \qquad (26)$$

$$u^{n+1} = u^* - \frac{\Delta t}{\rho(\phi^{n+1/2})}\nabla p^{n+1}. \qquad (27)$$

--

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 6 of 17 --Appendix--

$$\nabla \cdot u^* = \nabla \cdot \left( \frac{\Delta t}{\rho(\phi^{n+1/2})} \nabla p^{n+1} \right). \tag{28}$$

$$\int_\Omega u^* \cdot \nabla \psi \, dx = \int_\Omega \frac{\Delta t}{\rho(\phi^{n+1/2})} \nabla p^{n+1} \cdot \nabla \psi \, dx + \int_{\Gamma_1} \psi u^{BC} \cdot n \, dS, \tag{29}$$

$$\frac{\Delta t}{\rho(\phi^{n+1/2})} \frac{\partial p^{n+1}}{\partial n} = \left( u^* - u^{BC} \right) \cdot n. \tag{30}$$

$$u^{n+1/2} = (u^n + u^{n+1})/2. \tag{31}$$

$$\frac{\tau^{n+1} - \tau^n}{\Delta t} = \frac{-(u^{n+1/2} \cdot \nabla)\tau^n + \tau^n \cdot (\nabla u^{n+1/2}) + (\nabla u^{n+1/2})^T \cdot \tau^n}{-\frac{1}{\lambda(\phi^{n+1/2})} \left( \tau^{n+1} - 2\frac{\mu_p(\phi^{n+1/2})}{Re_p} D^{n+1/2} \right)}, \tag{32}$$

$$\left(1 + \frac{\Delta t}{\lambda_p(\phi^{n+1/2})}\right) \tau^{n+1}$$
$$= \tau^n + \Delta t \left[ -(u^{n+1/2} \cdot \nabla)\tau^n + \tau^n \cdot (\nabla u^{n+1/2}) + (\nabla u^{n+1/2})^T \cdot \tau^n \right] + \frac{2\Delta t \mu_p(\phi^{n+1/2})}{\lambda(\phi^{n+1/2}) Re_p} D^{n+1/2}. \tag{33}$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 7 of 17 --Appendix--

$$[(u \cdot \nabla)u]_{i,j}^{n+1/2} = \frac{u_{i+1/2,j}^{n+1/2} + u_{i-1/2,j}^{n+1/2}}{2} \frac{u_{i+1/2,j}^{n+1/2} - u_{i-1/2,j}^{n+1/2}}{\Delta r}$$
$$+ \frac{v_{i,j+1/2}^{n+1/2} + v_{i,j-1/2}^{n+1/2}}{2} \frac{u_{i,j+1/2}^{n+1/2} - u_{i,j-1/2}^{n+1/2}}{\Delta z}, \quad (34)$$

$$[(u \cdot \nabla)\phi]_{i,j}^{n+1/2} = \frac{u_{i+1/2,j}^{n+1/2} + u_{i-1/2,j}^{n+1/2}}{2} \frac{\phi_{i+1/2,j}^{n+1/2} - \phi_{i-1/2,j}^{n+1/2}}{\Delta r}$$
$$+ \frac{v_{i,j+1/2}^{n+1/2} + v_{i,j-1/2}^{n+1/2}}{2} \frac{\phi_{i,j+1/2}^{n+1/2} - \phi_{i,j-1/2}^{n+1/2}}{\Delta z}. \quad (35)$$

$$u_{i+1/2,j}^{n+1/2,L} = u_{i,j}^n + \frac{\Delta r}{2} u_{r,i,j}^n + \frac{\Delta t}{2} u_{t,i,j}^n$$
$$= u_{i,j}^n + \frac{1}{2}\left(\Delta r - \Delta t u_{i,j}^n\right) u_{r,i,j}^n - \frac{\Delta t}{2}\left(\widehat{vu_z}\right)_{i,j} + \frac{\Delta t}{2} F_{i,j}^n, \quad (36)$$

$$F_{i,j}^n = \left\{ -\frac{1}{\rho(\phi)}\nabla p + \frac{1}{\rho(\phi)Re}\nabla \cdot (2\mu(\phi)\mathcal{D}) + \nabla \cdot \tau - \frac{1}{\rho(\phi)We}\kappa(\phi)\delta(\phi)\nabla\phi \right\}_{i,j}^n. \quad (37)$$

$$u_{i+1/2,j}^{n+1/2,R} = u_{i+1,j}^n - \frac{\Delta r}{2} u_{r,i+1,j}^n + \frac{\Delta t}{2} u_{t,i+1,j}^n$$
$$= u_{i+1,j}^n - \frac{1}{2}\left(\Delta r + \Delta t u_{i+1,j}^n\right) u_{r,i+1,j}^n - \frac{\Delta t}{2}\left(\widehat{vu_z}\right)_{i+1,j} + \frac{\Delta t}{2} F_{i+1,j}^n. \quad (38)$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 8 of 17 --Appendix--

$$u_{i+1/2,j}^{n+1/2} = \begin{cases} u_{i+1/2,j}^{n+1/2,L} & \text{if } u_{i+1/2,j}^{n+1/2,L} > 0 \text{ and } u_{i+1/2,j}^{n+1/2,L} + u_{i+1/2,j}^{n+1/2,R} > 0 \\ u_{i+1/2,j}^{n+1/2,R} & \text{if } u_{i+1/2,j}^{n+1/2,R} < 0 \text{ and } u_{i+1/2,j}^{n+1/2,L} + u_{i+1/2,j}^{n+1/2,R} < 0 \\ 0 & \text{otherwise} \end{cases} \qquad (39)$$

$$v_{i+1/2,j}^{n+1/2} \left(\text{or } \phi_{i+1/2,j}^{n+1/2}\right) = \begin{cases} v_{i+1/2,j}^{n+1/2,L} \left(\text{or } \phi_{i+1/2,j}^{n+1/2,L}\right) & \text{if } u_{i+1/2,j}^{n+1/2} > 0 \\ v_{i+1/2,j}^{n+1/2,R} \left(\text{or } \phi_{i+1/2,j}^{n+1/2,R}\right) & \text{if } u_{i+1/2,j}^{n+1/2} < 0 \quad (40) \\ \dfrac{v_{i+1/2,j}^{n+1/2,L} + v_{i+1/2,j}^{n+1/2,R}}{2} \left(\text{or } \dfrac{\phi_{i+1/2,j}^{n+1/2,L} + \phi_{i+1/2,j}^{n+1/2,R}}{2}\right) & \text{if } u_{i+1/2,j}^{n+1/2} = 0 \end{cases}$$

$$u^e - \frac{1}{\rho(\phi^n)} \nabla q \qquad (41)$$

$$\nabla \cdot \left(\frac{1}{\rho(\phi^n)} \nabla q\right) = \nabla \cdot u^e . \qquad (42)$$

$$\frac{\partial}{\partial r}\left(\frac{r}{\rho(\phi)} \frac{\partial q}{\partial r}\right) + \frac{\partial}{\partial z}\left(\frac{r}{\rho(\phi)} \frac{\partial q}{\partial z}\right) = \frac{\partial}{\partial r}\left(r u^e\right) + \frac{\partial}{\partial r}\left(r v^e\right), \qquad (43)$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 9 of 17 --Appendix--

$$-\frac{1}{\Delta r^2}\left[\frac{r_{i+1/2,j}}{(\rho(\phi))_{i+1/2,j}}(q_{i+1,j}-q_{i,j})-\frac{r_{i-1/2,j}}{(\rho(\phi))_{i-1/2,j}}(q_{i,j}-q_{i-1,j})\right]$$
$$+\frac{r_{i,j}}{\Delta z^2}\left[\frac{1}{(\rho(\phi))_{i,j+1/2}}(q_{i,j+1}-q_{i,j})-\frac{1}{(\rho(\phi))_{i,j-1/2}}(q_{i,j}-q_{i,j-1})\right] \quad (44)$$
$$=\frac{r_{i+1/2,j}u_{i+1/2,j}^{n+1/2}-r_{i-1/2,j}u_{i-1/2,j}^{n+1/2}}{\Delta r}+\frac{r_{i,j}\left(v_{i,j+1/2}^{n+1/2}-v_{i,j-1/2}^{n+1/2}\right)}{\Delta z}.$$

$$q=\frac{\Delta t}{2}\Delta p^{boundary}, \quad (45)$$

$$u_{i+1/2,j}^{n+1/2} \leftarrow u_{i+1/2,j}^{n+1/2}-\frac{1}{(\rho(\phi))_{i+1/2,j}}\frac{q_{i+1,j}-q_{i,j}}{\Delta r},$$
$$v_{i,j+1/2}^{n+1/2} \leftarrow v_{i,j+1/2}^{n+1/2}-\frac{1}{(\rho(\phi))_{i,j+1/2}}\frac{q_{i,j+1}-q_{i,j}}{\Delta z}. \quad (46)$$

$$D_r^c(u)_{i,j}=(u_{i+1,j}-u_{i-1,j})/2,$$
$$D_r^+(u)_{i,j}=(u_{i+1,j}-u_{i,j}), \quad (47)$$
$$D_r^-(u)_{i,j}=(u_{i,j}-u_{i-1,j}).$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 10 of 17 --Appendix--

$$\delta_{lim}(u)_{i,j} = \begin{cases} \min(2|D_r^-(u)_{i,j}|, 2|D_r^+(u)_{i,j}|) & \text{if}(D_r^-(u)_{i,j})(D_r^+(u)_{i,j}) > 0 \\ 0 & \text{otherwise,} \end{cases} \tag{48}$$

$$\delta_f(u)_{i,j} = \min(|D_r^c(u)_{i,j}|, \delta_{lim}(u)_{i,j}) \times sign(D_r^c(u)_{i,j}). \tag{49}$$

$$\delta_r^4(u)_{i,j} = \min\left(\left|\frac{4D_r^c(u)_{i,j}}{3} - \frac{\delta_f(u)_{i+1,j} + \delta_f(u)_{i-1,j}}{6}\right|, \delta_{lim}(u)_{i,j}\right) \times sign(D_r^c(u)_{i,j}), \tag{50}$$

$$u_{r,i,j} = \delta_r^4(u)_{i,j} / \Delta r. \tag{51}$$

$$\widehat{(vu_z)}_{i,j} = \frac{\hat{v}_{i,j+1/2}^{adv} + \hat{v}_{i,j-1/2}^{adv}}{2} \frac{\hat{u}_{i,j+1/2} - \hat{u}_{i,j-1/2}}{\Delta z}. \tag{52}$$

$$\hat{u}_{i,j+1/2}^B = u_{i,j}^n + \frac{1}{2}(\Delta z - \Delta t v_{i,j}^n)u_{z,i,j}^n,$$
$$\hat{u}_{i,j+1/2}^T = u_{i,j+1}^n - \frac{1}{2}(\Delta z + \Delta t v_{i,j+1}^n)u_{z,i,j+1}^n. \tag{53}$$

$$\hat{v}_{i,j+1/2}^{adv} = \begin{cases} \hat{v}_{i,j+1/2}^B & \text{if } \hat{v}_{i,j+1/2}^B > 0 \text{ and } \hat{v}_{i,j+1/2}^B + \hat{v}_{i,j+1/2}^T > 0 \\ \hat{v}_{i,j+1/2}^T & \text{if } \hat{v}_{i,j+1/2}^T < 0 \text{ and } \hat{v}_{i,j+1/2}^B + \hat{v}_{i,j+1/2}^T < 0 \\ 0 & \text{otherwise,} \end{cases} \tag{54}$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 11 of 17 --Appendix--

-- 
$$\hat{u}_{i,j+1/2} = \begin{cases} \hat{u}^B_{i,j+1/2} & \text{if } \hat{v}^{adv}_{i,j+1/2} > 0 \\ \hat{u}^T_{i,j+1/2} & \text{if } \hat{v}^{adv}_{i,j+1/2} < 0 \\ \dfrac{\hat{u}^B_{i,j+1/2} + \hat{u}^T_{i,j+1/2}}{2} & \text{if } \hat{v}^{adv}_{i,j+1/2} = 0. \end{cases} \quad (55)$$

$$(u^{n+1/2} \cdot \nabla)\tau^n = \max(u^{n+1/2}_{i,j},0)\frac{\tau^n_{i,j}-\tau^n_{i-1,j}}{\Delta x} + \min(u^{n+1/2}_{i,j},0)\frac{\tau^n_{i+1,j}-\tau^n_{i,j}}{\Delta x}$$
$$+ \max(v^{n+1/2}_{i,j},0)\frac{\tau^n_{i,j}-\tau^n_{i,j-1}}{\Delta y} + \min(v^{n+1/2}_{i,j},0)\frac{\tau^n_{i,j+1}-\tau^n_{i,j}}{\Delta y}. \quad (56)$$

$$H(\phi) = \begin{cases} 0 & \text{if } \phi < -\varepsilon \\ \dfrac{1}{2}[1+\dfrac{\phi}{\varepsilon}+\dfrac{1}{\pi}\sin(\pi\phi/\varepsilon)] & \text{if } |\phi| \le \varepsilon \\ 1 & \text{if } \phi > \varepsilon. \end{cases} \quad (57)$$

$$\delta(\phi) = \frac{dH(\phi)}{d\phi}. \quad (58)$$

$$\varepsilon = \frac{\alpha}{2}(\Delta r + \Delta z), \quad (59)$$
--

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 12 of 17 --Appendix--

$$\Delta t < \min_{i,j} \left[ \frac{\Delta r}{|u| + [2(\tau_{rr} + 1/\lambda Re)]^{1/2}}, \frac{\Delta z}{|v| + [2(\tau_{zz} + 1/\lambda Re)]^{1/2}}, \right.$$
$$\left. \sqrt{We \frac{\rho_1 + \rho_2}{8\pi} h^{3/2}}, \frac{Re}{2} \frac{\rho^n}{\mu^n} \left( \frac{1}{\Delta r^2} + \frac{1}{\Delta z^2} \right)^{-1}, \sqrt{\frac{2h}{|F|}} \right], \quad (60)$$

$$\frac{u^{n+1} - u^n}{\Delta t} + \left[ (u \cdot \nabla) u \right]^{n+1/2}$$
$$= -\frac{1}{\rho(\phi^{n+1/2})} \nabla p^{n+1/2} + \frac{1}{\rho(\phi^{n+1/2}) Re} \nabla \cdot \left[ 2\mu(\phi^{n+1/2}) \mathcal{D}^{n+1/2} \right] \quad (61)$$
$$+ \nabla \cdot \tau^{n+1/2} - \frac{1}{\rho(\phi^{n+1/2}) We} \left[ \kappa(\phi) \delta(\phi) \nabla \phi \right]^{n+1/2},$$

$$\nabla \cdot u^{n+1} = 0,$$

$$\mathcal{D}^{n+1/2} = \frac{1}{2} (\mathcal{D}^n + \mathcal{D}^{n+1}) = \frac{1}{2} \left\{ \frac{1}{2} \left[ \nabla u + (\nabla u)^T \right]^n + \frac{1}{2} \left[ \nabla u + (\nabla u)^T \right]^{n+1} \right\}, \quad (62)$$

$$u^{**} = u^n + \Delta t \left\{ -\left[ (u \cdot \nabla) u \right]^{n+1/2} - \frac{1}{\rho(\phi^{n+1/2})} \nabla p^{n-1/2} + \frac{1}{\rho(\phi^{n+1/2}) Re} \nabla \cdot \left[ \mu(\phi^{n+1/2}) \mathcal{D}^n \right] \right.$$
$$\left. + \nabla \cdot \tau^{n+1/2} - \frac{1}{\rho(\phi^{n+1/2}) We} \left[ \kappa(\phi) \delta(\phi) \nabla \phi \right]^{n+1/2} \right\}. \quad (63)$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 13 of 17 --Appendix--

$$u^* - \frac{\Delta t}{\rho(\phi^{n+1/2})Re} \nabla \cdot \left[ \mu(\phi^{n+1/2}) \mathcal{D}^* \right] = u^{**}, \quad (64)$$

--
--

$$\mathcal{D}^* = \frac{1}{2}\left[ \nabla u^* + (\nabla u^*)^T \right]. \quad (65)$$

$$u^* \leftarrow u^* + \frac{\Delta t}{\rho(\phi^{n+1/2})} \nabla p^{n-1/2}. \quad (66)$$

$$u^{n+1} = u^* - \frac{\Delta t}{\rho(\phi^{n+1/2})} \nabla p^{n+1/2}. \quad (67)$$

$$\nabla \cdot u^* = \nabla \cdot \left( \frac{\Delta t}{\rho(\phi^{n+1/2})} \nabla p^{n+1/2} \right). \quad (68)$$

$$\frac{\tau^{n+1} - \tau^n}{\Delta t} = \left[ -(u \cdot \nabla)\tau + \tau \cdot (\nabla u) + (\nabla u)^T \cdot \tau \right]^{n+1/2} - \frac{1}{\lambda(\phi^{n+1/2})}\left( \tau^{n+1} - 2\frac{\mu_p(\phi^{n+1/2})}{Re_p} \mathcal{D}^{n+1/2} \right), \quad (69)$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 14 of 17 --Appendix--

$$\left(1 + \frac{\Delta t}{\lambda_p(\phi^{n+1/2})}\right)\tau^{n+1} = \tau^n + \Delta t\left[-(u\cdot\nabla)\tau + \tau\cdot(\nabla u) + (\nabla u)^T\cdot\tau\right]^{n+1/2} + \frac{2\Delta t\mu_p(\phi^{n+1/2})}{\lambda(\phi^{n+1/2})Re_p}\mathcal{D}^{n+1/2}. \quad (70)$$

$$\left[(u\cdot\nabla)\tau\right]_{i,j}^{n+1/2} = \frac{u_{i+1/2,j}^{n+1/2} + u_{i-1/2,j}^{n+1/2}}{2}\frac{\tau_{i+1/2,j}^{n+1/2} - \tau_{i-1/2,j}^{n+1/2}}{\Delta r} + \frac{v_{i,j+1/2}^{n+1/2} + v_{i,j-1/2}^{n+1/2}}{2}\frac{\tau_{i,j+1/2}^{n+1/2} - \tau_{i,j-1/2}^{n+1/2}}{\Delta z}, \quad (71)$$

$$\tau_{i+1/2,j}^{n+1/2,L} = \tau_{i,j}^n + \frac{\Delta r}{2}\tau_{r,i,j}^n + \frac{\Delta t}{2}\tau_{t,i,j}^n$$
$$= \tau_{i,j}^n + \frac{1}{2}\left(\Delta r - \Delta t u_{i,j}^n\right)\tau_{r,i,j}^n - \frac{\Delta t}{2}\left(\widehat{v\tau_z}\right)_{i,j} + \frac{\Delta t}{2}G_{i,j}^n, \quad (72)$$

$$G_{i,j}^n = \left\{\tau\cdot(\nabla u) + (\nabla u)^T\cdot\tau - \frac{1}{\lambda(\phi)}\left(\tau - 2\frac{\mu_p(\phi)}{Re_p}\mathcal{D}\right)\right\}_{i,j}^n. \quad (73)$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 15 of 17 --Appendix--

$$\begin{aligned}\tau_{i+1/2,j}^{n+1/2,R} &= \tau_{i+1,j}^n - \frac{\Delta r}{2}\tau_{r,i+1,j}^n + \frac{\Delta t}{2}\tau_{t,i+1,j}^n \\ &= \tau_{i+1,j}^n - \frac{1}{2}\left(\Delta r + \Delta t u_{i+1,j}^n\right)\tau_{r,i+1,j}^n - \frac{\Delta t}{2}\left(\widehat{v\tau_z}\right)_{i+1,j} + \frac{\Delta t}{2}G_{i+1,j}^n.\end{aligned} \quad (74)$$

$$\tau_{i+1/2,j}^{n+1/2} = \begin{cases} \tau_{i+1/2,j}^{n+1/2,L} & \text{if } u_{i+1/2,j}^{n+1/2} > 0 \\ \tau_{i+1/2,j}^{n+1/2,R} & \text{if } u_{i+1/2,j}^{n+1/2} < 0 \\ \dfrac{\tau_{i+1/2,j}^{n+1/2,L} + \tau_{i+1/2,j}^{n+1/2,R}}{2} & \text{if } u_{i+1/2,j}^{n+1/2} = 0. \end{cases} \quad (75)$$

$$\begin{aligned}[\tau \cdot (\nabla u)]^{n+1/2} &= (u_{,r}\tau_{rr} + u_{,z}\tau_{rz})^{n+1/2}e_r e_r + (v_{,r}\tau_{rr} + v_{,z}\tau_{rz})^{n+1/2}e_r e_z \\ &+ (u_{,r}\tau_{rz} + u_{,z}\tau_{zz})^{n+1/2}e_z e_r + (v_{,r}\tau_{rz} + v_{,z}\tau_{zz})^{n+1/2}e_z e_z + \frac{u^{n+1/2}}{r}\tau_{\theta\theta}^{n+1/2}e_\theta e_\theta.\end{aligned} \quad (76)$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 16 of 17 --Appendix--

$$-- \begin{aligned} u_{,r}\tau_{rr} + u_{,z}\tau_{rz} &= \frac{u_{i+1/2,j} - u_{i-1/2,j}}{\Delta r} \frac{\tau_{rr,i+1/2,j} + \tau_{rr,i-1/2,j} + \tau_{rr,i,j+1/2} + \tau_{rr,i,j-1/2}}{4} \\ &+ \frac{u_{i,j+1/2} - u_{i,j-1/2}}{\Delta z} \frac{\tau_{rz,i+1/2,j} + \tau_{rz,i-1/2,j} + \tau_{rz,i,j+1/2} + \tau_{rz,i,j-1/2}}{4}, \\ v_{,r}\tau_{rr} + v_{,z}\tau_{rz} &= \frac{v_{i+1/2,j} - v_{i-1/2,j}}{\Delta r} \frac{\tau_{rr,i+1/2,j} + \tau_{rr,i-1/2,j} + \tau_{rr,i,j+1/2} + \tau_{rr,i,j-1/2}}{4} \\ &+ \frac{v_{i,j+1/2} - v_{i,j-1/2}}{\Delta z} \frac{\tau_{rz,i+1/2,j} + \tau_{rz,i-1/2,j} + \tau_{rz,i,j+1/2} + \tau_{rz,i,j-1/2}}{4}, \\ u_{,r}\tau_{rz} + u_{,z}\tau_{zz} &= \frac{u_{i+1/2,j} - u_{i-1/2,j}}{\Delta r} \frac{\tau_{rz,i+1/2,j} + \tau_{rz,i-1/2,j} + \tau_{rz,i,j+1/2} + \tau_{rz,i,j-1/2}}{4} \\ &+ \frac{u_{i,j+1/2} - u_{i,j-1/2}}{\Delta z} \frac{\tau_{zz,i+1/2,j} + \tau_{zz,i-1/2,j} + \tau_{zz,i,j+1/2} + \tau_{zz,i,j-1/2}}{4}, \\ v_{,r}\tau_{rz} + v_{,z}\tau_{zz} &= \frac{v_{i+1/2,j} - v_{i-1/2,j}}{\Delta r} \frac{\tau_{rz,i+1/2,j} + \tau_{rz,i-1/2,j} + \tau_{rz,i,j+1/2} + \tau_{rz,i,j-1/2}}{4} \\ &+ \frac{v_{i,j+1/2} - v_{i,j-1/2}}{\Delta z} \frac{\tau_{zz,i+1/2,j} + \tau_{zz,i-1/2,j} + \tau_{zz,i,j+1/2} + \tau_{zz,i,j-1/2}}{4}, \\ \frac{u}{r}\tau_{\theta\theta} &= \frac{u_{i+1/2,j} + u_{i-1/2,j} + u_{i,j+1/2} + u_{i,j-1/2}}{4 r_{i,j}} \frac{\tau_{\theta\theta,i+1/2,j} + \tau_{\theta\theta,i-1/2,j} + \tau_{\theta\theta,i,j+1/2} + \tau_{\theta\theta,i,j-1/2}}{4}. \end{aligned} --$$

(77)

$$\nabla \cdot \tau^{n+1/2} = \left( \tau_{rr,r} + \tau_{rz,z} + \frac{\tau_{rr} - \tau_{\theta\theta}}{r} \right)^{n+1/2} e_r + \left( \tau_{rz,r} + \tau_{zz,z} + \frac{\tau_{rz}}{r} \right)^{n+1/2} e_z . \qquad (78)$$

UNITED STATES PATENT AND TRADEMARK OFFICE
CERTIFICATE OF CORRECTION

PATENT NO. : 7,478,023 B2
APPLICATION NO. : 11/205441
DATED : January 13, 2009
INVENTOR(S) : Jiun-Der Yu It is certified that error appears in the above-identified patent and that said Letters Patent is hereby corrected as shown below:

Column 14, after line 25, please insert page 17 of 17 --Appendix--

$$(\tau_{rr,r}^{n+1/2})_{i,j} = (\tau_{rr,i+1/2,j}^{n+1/2} - \tau_{rr,i-1/2,j}^{n+1/2})/\Delta r,$$

$$(\tau_{rz,z}^{n+1/2})_{i,j} = (\tau_{rz,i,j+1/2}^{n+1/2} - \tau_{rz,i,j-1/2}^{n+1/2})/\Delta z,$$

$$(\tau_{rz,r}^{n+1/2})_{i,j} = (\tau_{rz,i+1/2,j}^{n+1/2} - \tau_{rz,i-1/2,j}^{n+1/2})/\Delta r,$$

$$(\tau_{zz,z}^{n+1/2})_{i,j} = (\tau_{zz,i,j+1/2}^{n+1/2} - \tau_{zz,i,j-1/2}^{n+1/2})/\Delta z,$$

$$\left(\frac{\tau_{rr}^{n+1/2} - \tau_{\theta\theta}^{n+1/2}}{r}\right)_{i,j} = \frac{\tau_{rr,i+1/2,j}^{n+1/2} + \tau_{rr,i-1/2,j}^{n+1/2} + \tau_{rr,i,j+1/2}^{n+1/2} + \tau_{rr,i,j-1/2}^{n+1/2}}{4r_{i,j}}$$

$$- \frac{\tau_{\theta\theta,i+1/2,j}^{n+1/2} + \tau_{\theta\theta,i-1/2,j}^{n+1/2} + \tau_{\theta\theta,i,j+1/2}^{n+1/2} + \tau_{\theta\theta,i,j-1/2}^{n+1/2}}{4r_{i,j}}.$$

(79)

$$\rho_1 = 1070\ Kg/m^3, \quad \mu_1 = 1.783 \times 10^{-3}\ Kg/m \cdot sec,$$
$$\mu_p = 1.783 \times 10^{-3}\ Kg/m \cdot sec, \quad \sigma = 0.0396\ Kg/sec^2.$$

(80)

$$Re = 90., \quad We = 24.3, \quad Re_p = 90..$$

(81)

$$\rho_2 = 1.225\ Kg/m^3, \quad \mu_2 = 1.77625 \times 10^{-3}\ Kg/m \cdot sec.$$

(82)

Signed and Sealed this

Thirtieth Day of June, 2009

JOHN DOLL
*Acting Director of the United States Patent and Trademark Office*